US 6,542,312 B1

(12) United States Patent
Okayama et al.

(10) Patent No.: US 6,542,312 B1
(45) Date of Patent: Apr. 1, 2003

(54) ZOOM LENS AND VIDEO CAMERA USING THE SAME

(75) Inventors: Hiroaki Okayama, Yamatotakada; Shusuke Ono, Takatsuki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/539,134

(22) Filed: Mar. 30, 2000

(30) Foreign Application Priority Data

Apr. 5, 1999 (JP) .......................................... 11-097426

(51) Int. Cl.⁷ .............................................. G02B 15/14
(52) U.S. Cl. ....................................... 359/687; 359/683
(58) Field of Search ................................ 359/687, 683, 359/676, 708, 713–715

(56) References Cited

U.S. PATENT DOCUMENTS

| 5,189,558 A | | 2/1993 | Ishii et al. .................... 359/687 |
| 5,257,135 A | | 10/1993 | Kohno et al. ................ 359/689 |
| 5,719,708 A | * | 2/1998 | Nagaoka ....................... 359/687 |
| 5,978,152 A | * | 11/1999 | Okayama et al. ........... 359/687 |
| 6,118,593 A | * | 9/2000 | Tochigi ....................... 359/687 |

FOREIGN PATENT DOCUMENTS

| EP | 0 841 585 | * | 5/1998 |
| JP | 4-43311 | | 2/1992 |
| JP | 5-134178 | | 5/1993 |
| WO | WO97/38340 | * | 10/1997 |

OTHER PUBLICATIONS

Patent Abstracts of Japan, Publication No. 05134178, Publication Date May 28, 1993, 1 page.
Patent Abstracts of Japan, Publication No. 04043311, Publication Date Feb. 13, 1992, 1 page.
European Search Report dated Jan. 30, 2002, 3 pages, Application No. 00107053. 1–2217.

* cited by examiner

Primary Examiner—Jordan M. Schwartz
(74) Attorney, Agent, or Firm—Rosenthal & Osha L.L.P.

(57) ABSTRACT

A zoom lens is described that includes: a first lens group having positive refracting power and fixed with respect to an image plane; a second lens group having negative refracting power and varying power, wherein the power is varied by moving along an optical axis; a third lens group having positive refracting power and fixed with respect to the image plane; and a fourth lens group having: positive refracting power and moving along an optical axis so as to keep the image plane varied by movement of the second lens group and an object at a predetermined position from a reference surface. The first, second, third, and fourth lens groups are disposed from the object side to the image plane side in this order. The second lens group is composed of two negative lenses and one positive lens. The third lens group is composed of two positive lenses and one negative lens. The fourth lens group is composed of a positive lens. The second to fourth lens groups include at least one aspherical surface, respectively.

20 Claims, 20 Drawing Sheets

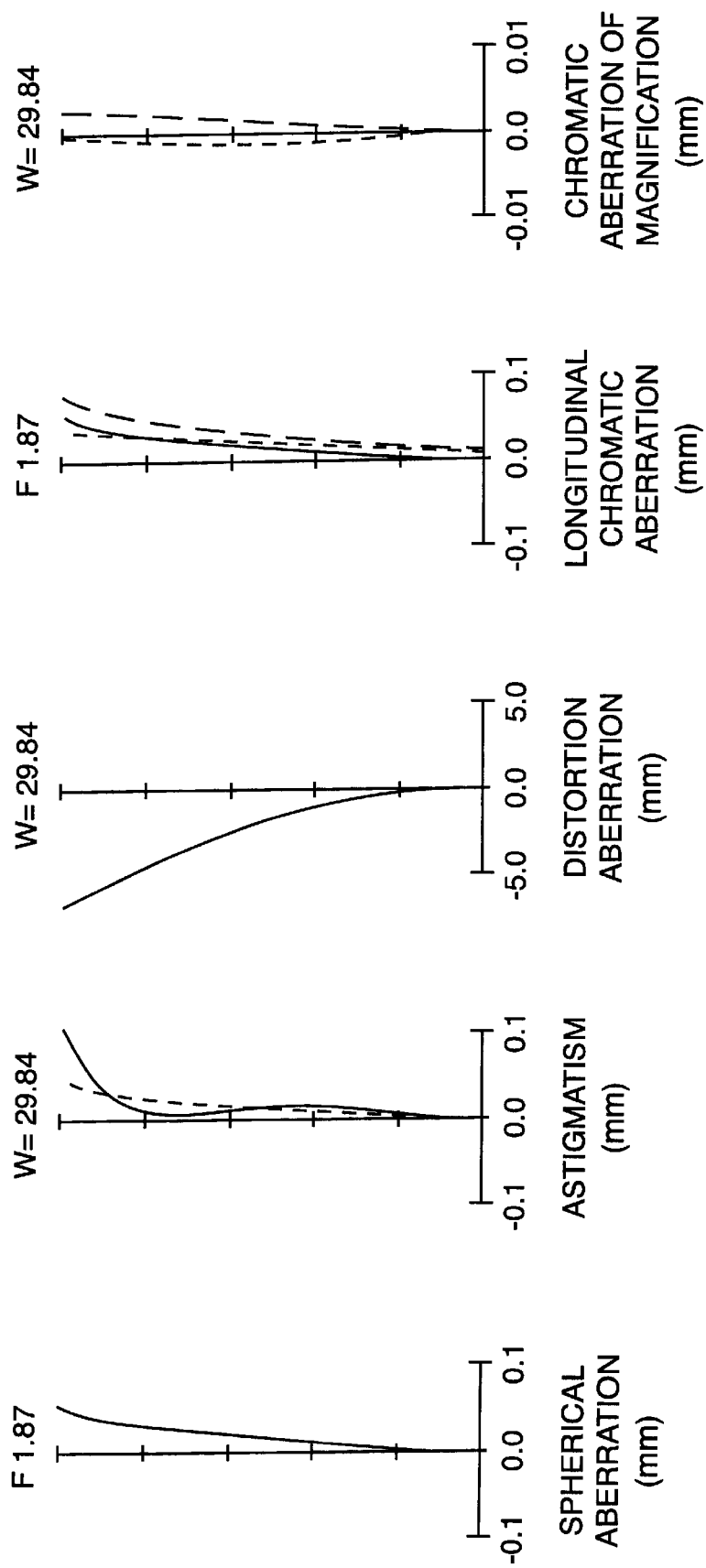

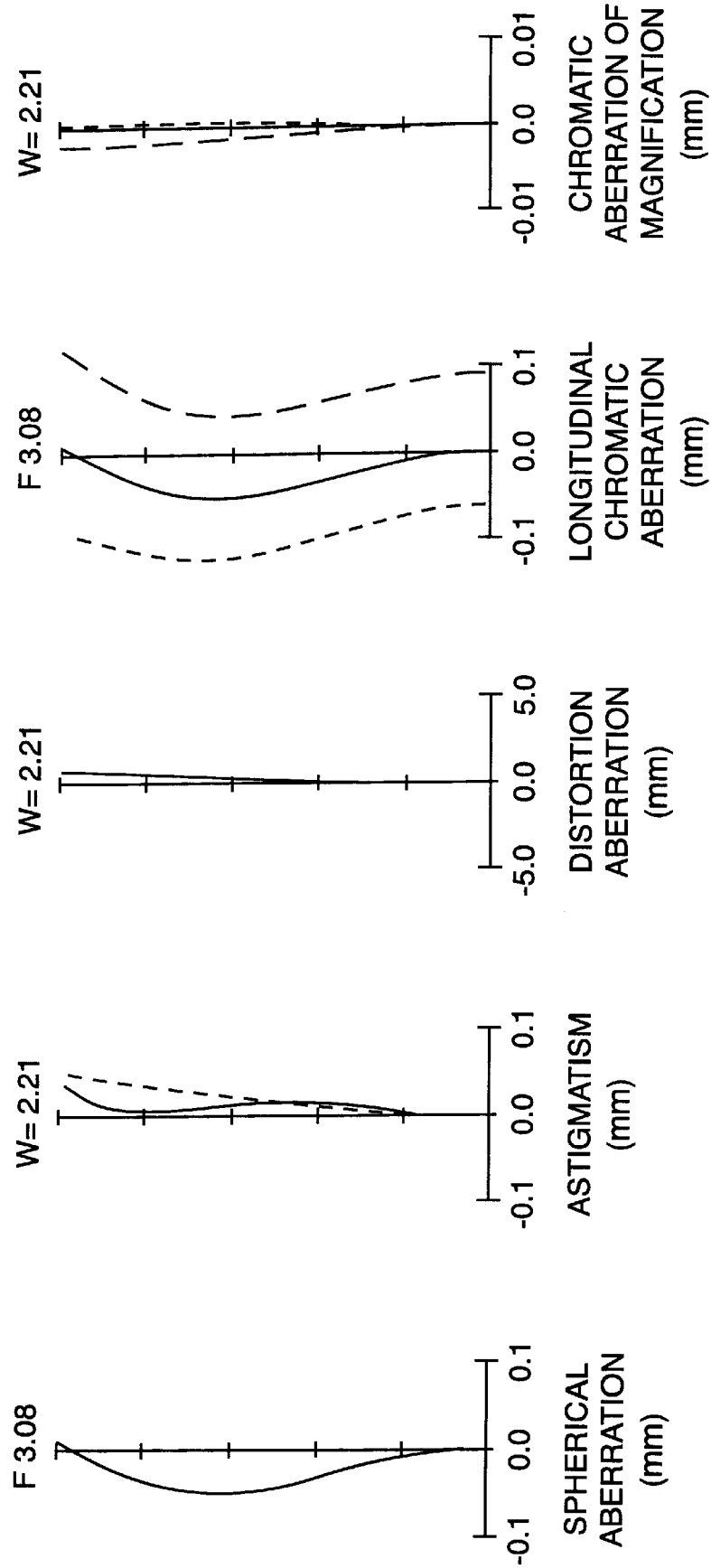

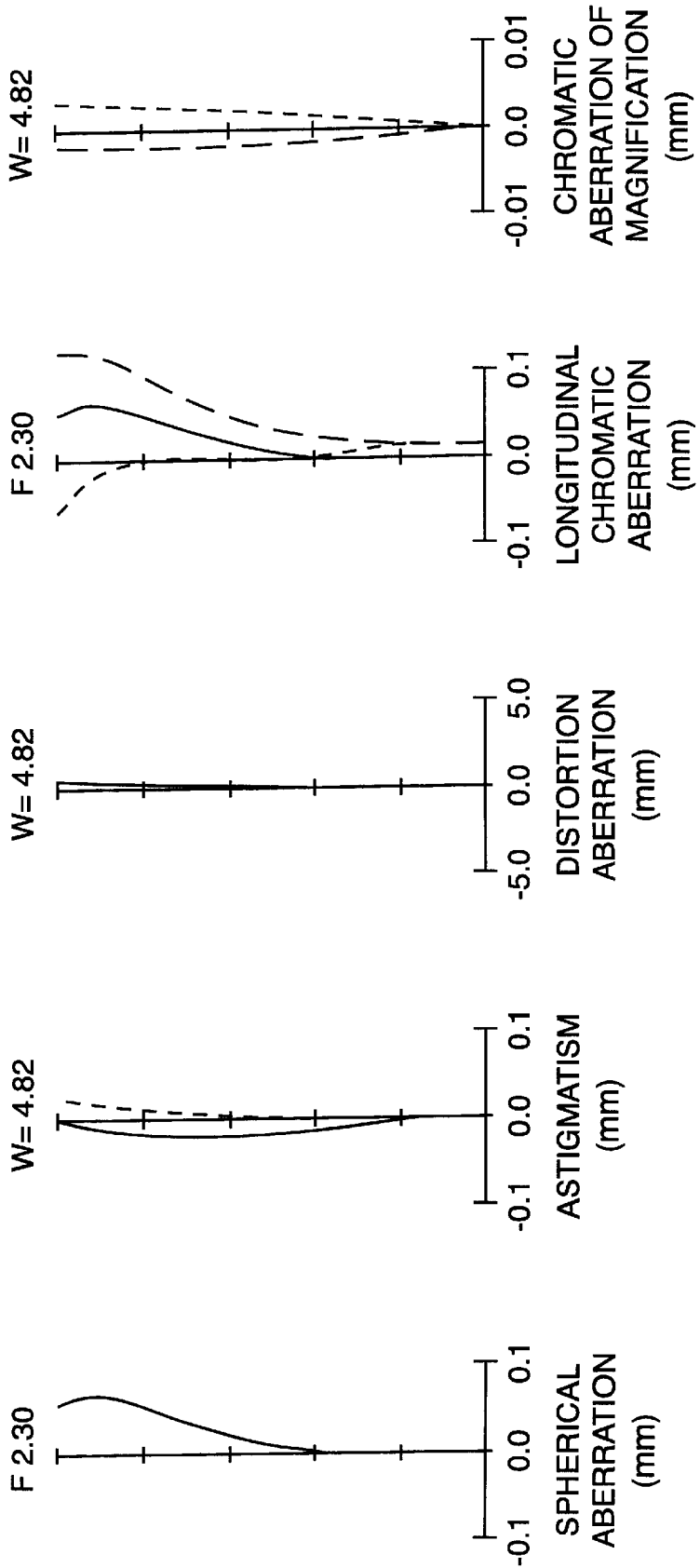

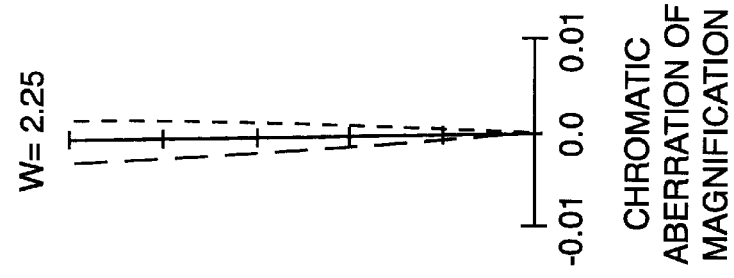
FIG. 11A SPHERICAL ABERRATION (mm) F 3.08
FIG. 11B ASTIGMATISM (mm) W= 2.25
FIG. 11C DISTORTION ABERRATION (mm) W= 2.25
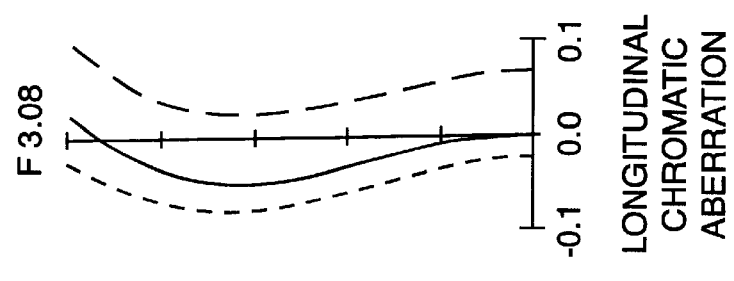
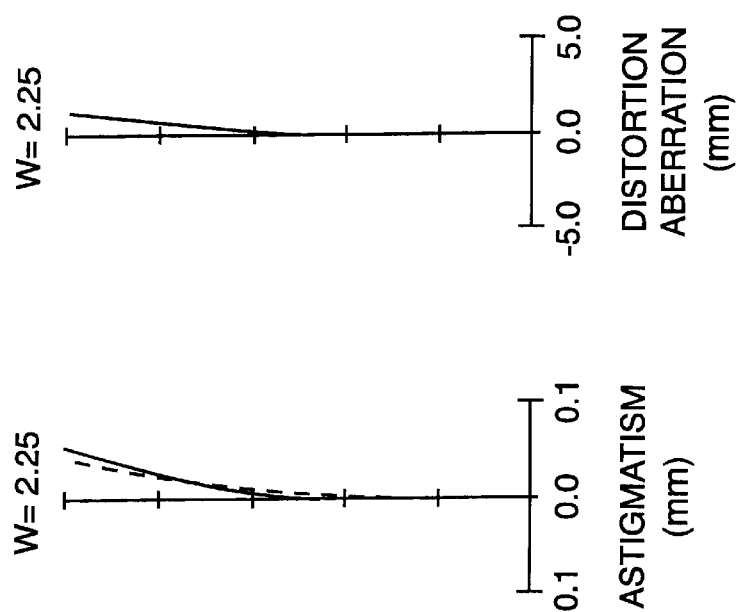
FIG. 11D LONGITUDINAL CHROMATIC ABERRATION (mm) F 3.08
FIG. 11E CHROMATIC ABERRATION OF MAGNIFICATION (mm) W= 2.25
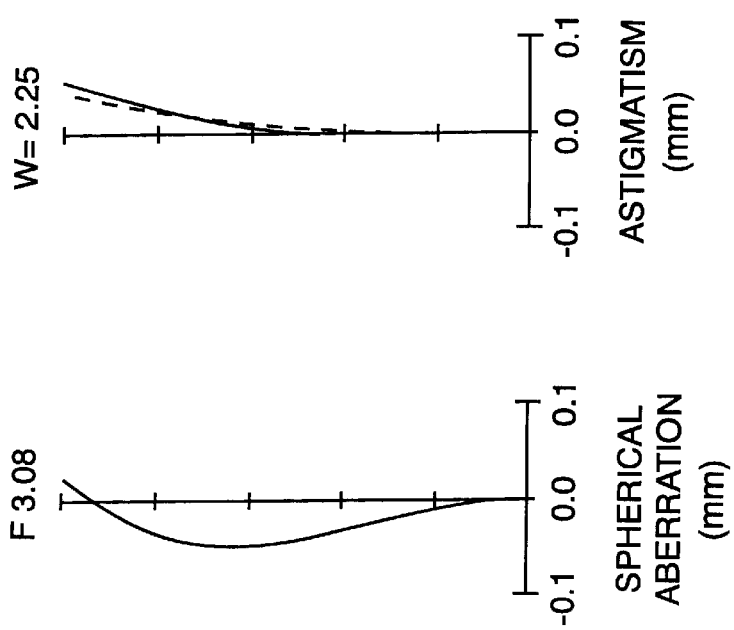

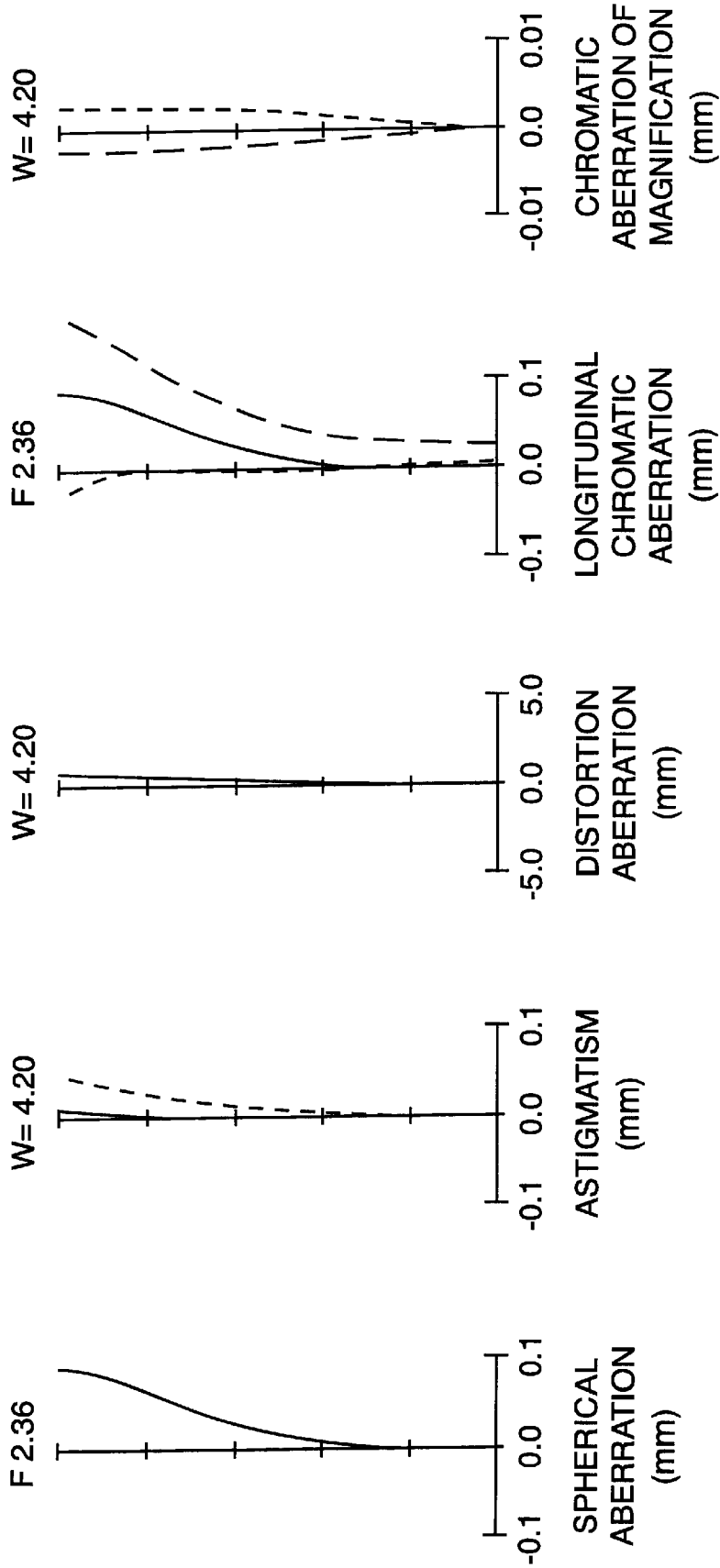

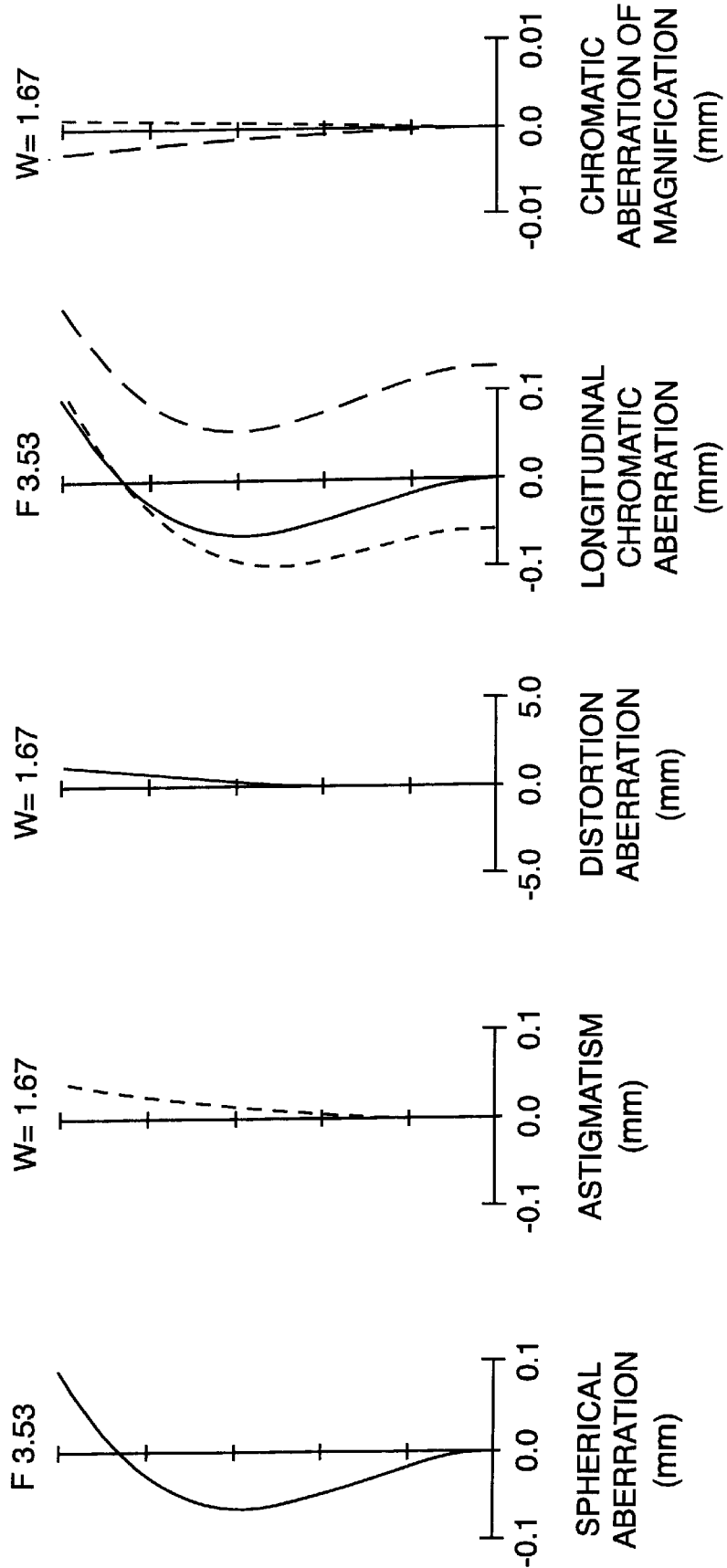

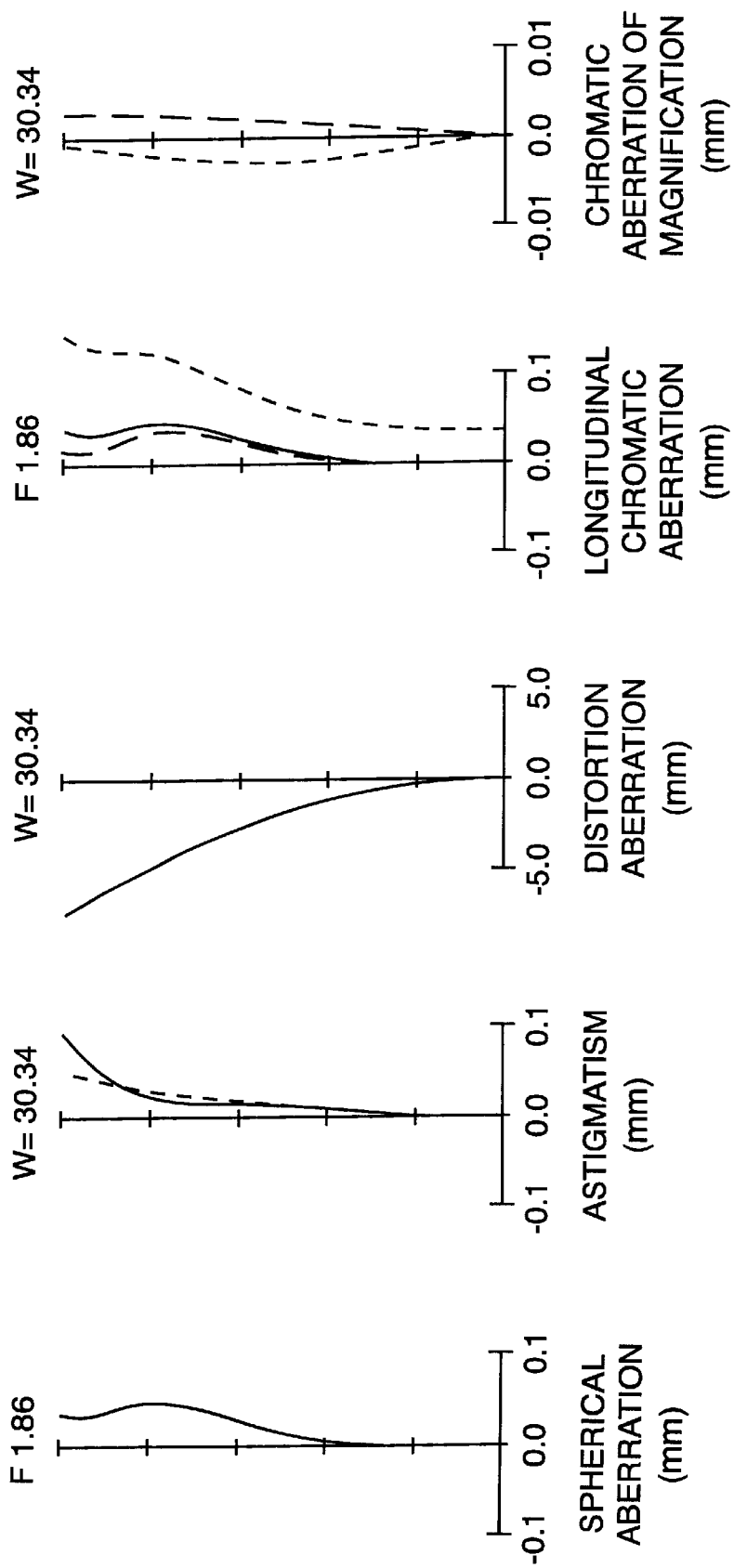

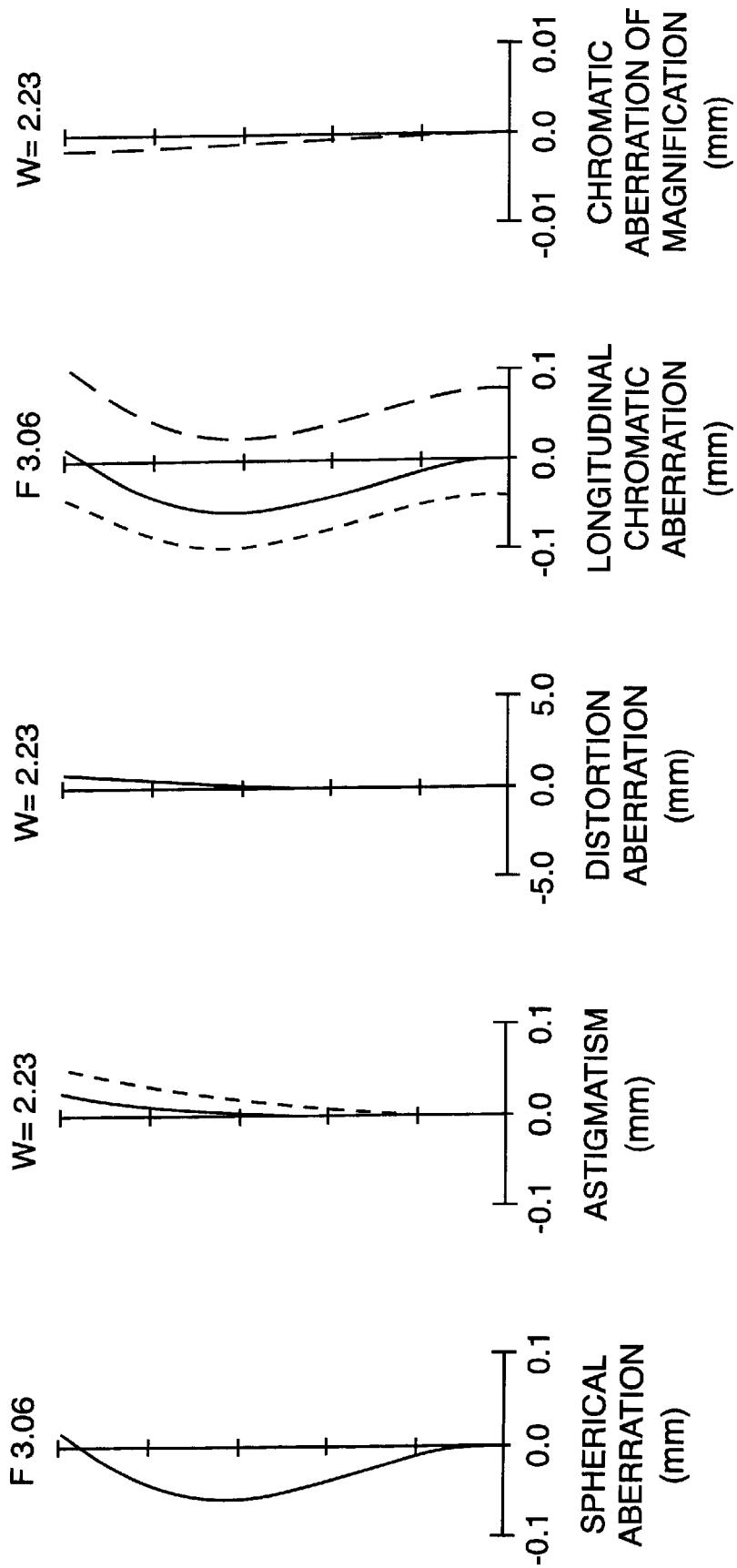

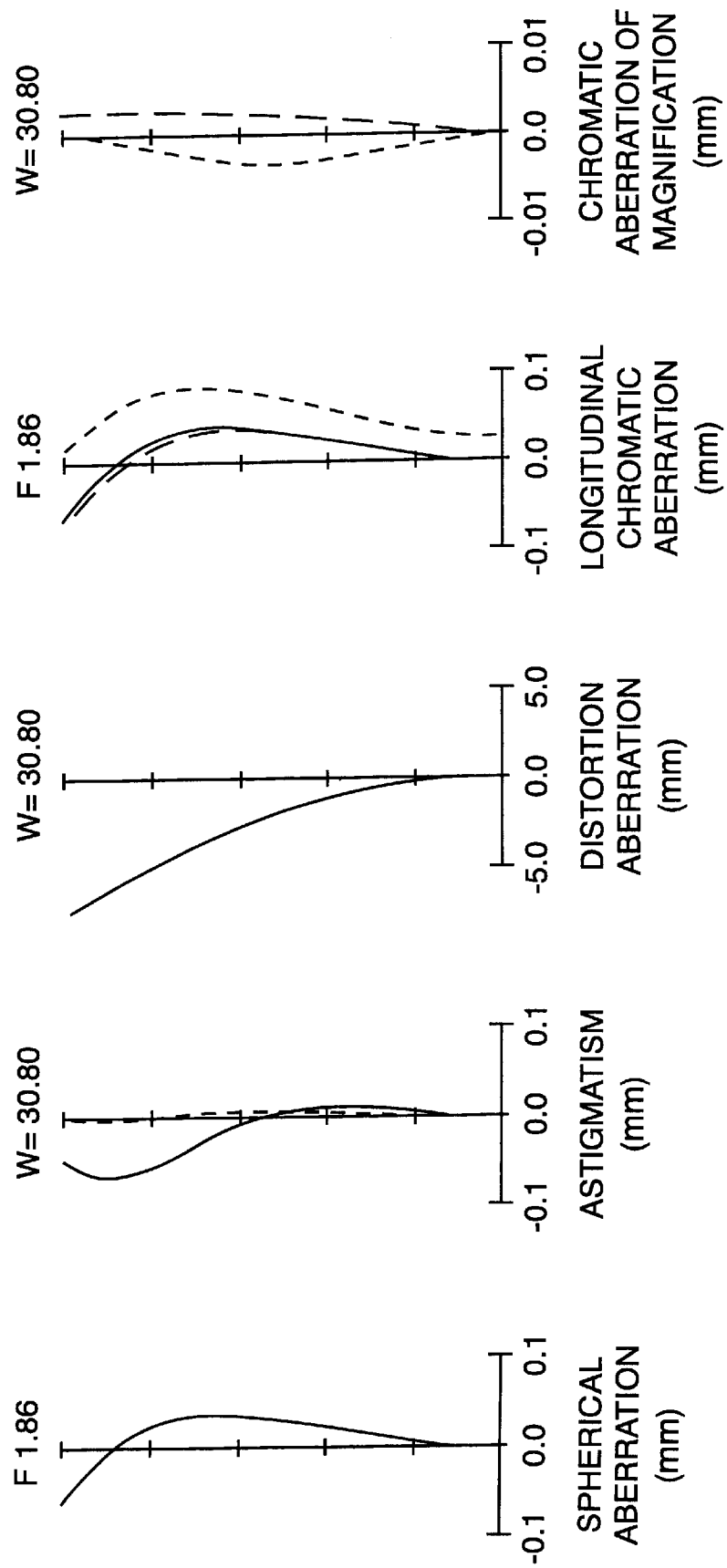

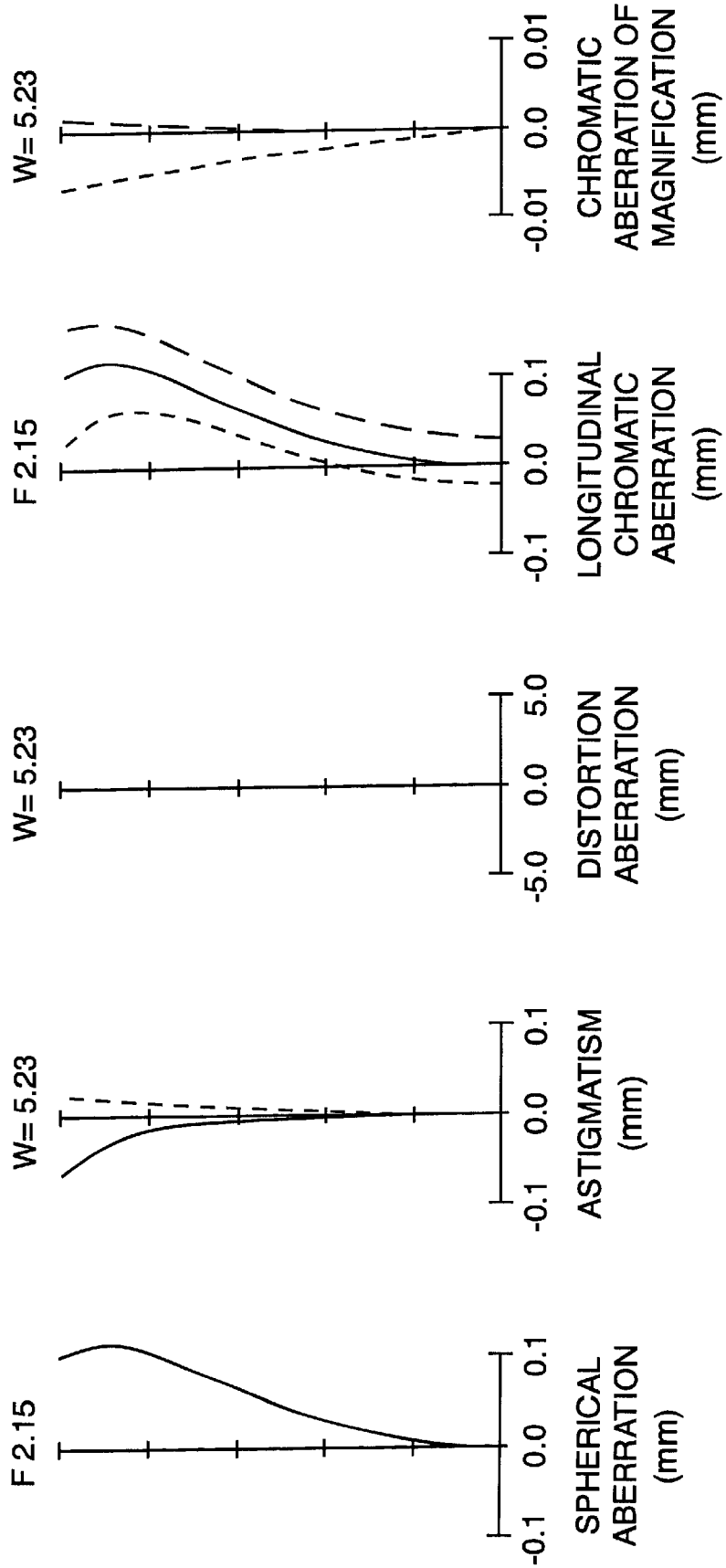

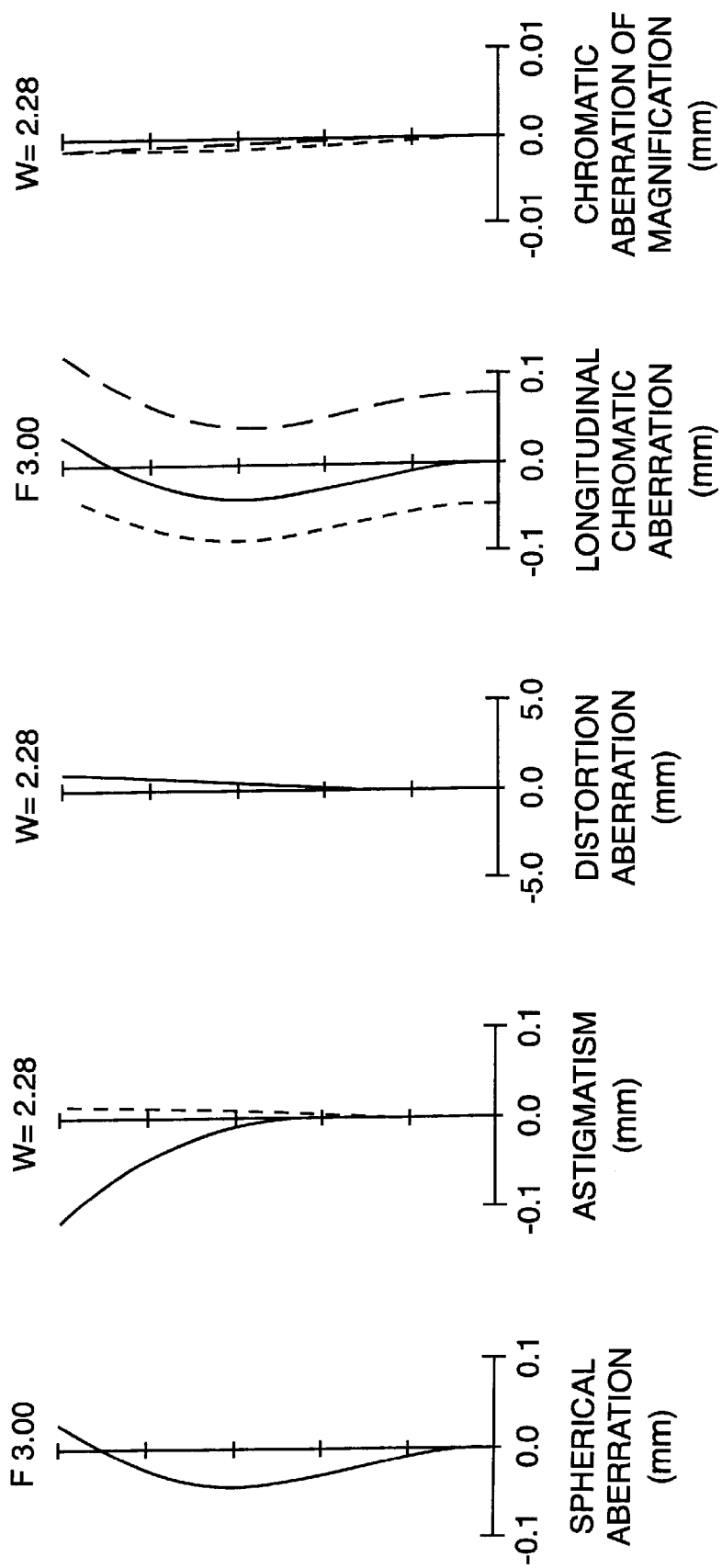

ZOOM LENS AND VIDEO CAMERA USING THE SAME

FIELD OF THE INVENTION

The present invention relates to a zoom lens and a video camera using the same. More specifically, the present invention relates to a miniature aspherical zoom lens with a high magnification (14 times or more) and a short optical full length, and a video camera using the same.

BACKGROUND OF THE INVENTION

With widespread use of a digital video (DV) format, miniaturization and high image quality are important elements in commercial video cameras. Therefore, zoom lenses to be mounted thereon also are required to be small while achieving high image quality, having a short optical full length and a high zoom ratio.

For example, JP 9-281392 A discloses a zoom lens of high image quality with a zoom ratio of about 10 times.

The zoom lens disclosed by JP 9-281392 A realizes miniaturization and high image quality with a lens structure including only ten lenses; however, its zoom ratio is about 10 times.

In order to realize a higher zoom ratio while maintaining high image quality, it is required to use at least ten lenses or enlarge an optical full length, which makes it impossible to obtain a miniature zoom lens.

SUMMARY OF THE INVENTION

Therefore, with the foregoing in mind, it is an object of the present invention to provide a zoom lens having a zoom ratio of 14 times or more with a smaller number of lenses, and a miniature video camera of high image quality using the zoom lens.

In some embodiments, the zoom lens of the present invention includes: a first lens group having positive refracting power and fixed with respect to an image plane; a second lens group having negative refracting power and varying power, wherein the power is varied by moving along an optical axis; a third lens group having positive refracting power and fixed with respect to the image plane; and a fourth lens group having positive refracting power and moving along an optical axis so as to keep the image plane at a predetermined position from a reference surface, the first, second, third and fourth lens groups being disposed from the object side to the image plane side in this order, wherein the second lens group includes at least one aspherical surface, the third lens group is composed of three lenses including two positive lenses and one negative lens and includes at least one aspherical surface, and the fourth lens group is composed of a positive lens including at least one aspherical surface.

In some embodiments, the third lens group is composed of three lenses: two positive lenses and one negative lens, whereby a miniature zoom lens is realized, in which spherical aberration is corrected satisfactorily from a wide-angle end to a standard position. Furthermore, by disposing at least one aspherical surface in each of the second, third and fourth lens groups that have a small lens diameter and adopting optimum aspherical surface shape and lens type, a miniature zoom lens with a zoom ratio of 14 times or more can be realized with a lens structure using a small number of lenses, in which an aberration is corrected satisfactorily.

In some embodiments, the third lens group is composed of three lenses including a positive lens,-a positive lens and a negative lens disposed from the object side in this order.

In some embodiments, the third lens group is composed of three lenses including a positive lens, and a cemented lens of a positive lens and a negative lens disposed from the object side in this order.

In some embodiments, the third lens group is composed of three lenses including a positive lens, a negative lens, and a positive lens, disposed from the object side in this order.

In some embodiments, the third lens group is composed of three lenses including a positive lens, and a cemented lens of a negative lens and a positive lens disposed from the object side in this order.

In some embodiments, the second lens group is composed of three lenses including a first negative lens, a second negative lens and a positive lens disposed from the object side in this order, a surface on the object side of the second negative lens is aspherical, and a local radius of curvature R10 in the vicinity of an optical axis and a local radius of curvature R11 in an outer peripheral portion satisfy the following conditional expression (1):

$$0.5 < R11/R10 < 0.95 \quad (1)$$

Using this example, a coma aberration at a wide-angle end and spherical aberration at a telephoto end are corrected satisfactorily.

In some embodiments, a focal length f3 of the third lens group and a focal length fw of an entire system at a wide-angle end satisfy the following conditional expression (2):

$$2.5 < f3/fw < 4.0 \quad (2)$$

Using this example, a miniature zoom lens is realized, which ensures a back-focus enabling a crystal filter, an IR cut filter, and the like to be inserted.

In some embodiments, a surface on the object side of a lens disposed closest to the object side in the third lens group is aspherical, and a local radius of curvature R20 in the vicinity of an optical axis and a local radius of curvature R21 in an outer peripheral portion satisfy the following conditional expression (3):

$$1.05 < R21/R20 < 3.5 \quad (3)$$

Using this example, a zoom lens is realized, in which a spherical aberration in an entire zoom region is corrected satisfactorily.

In some embodiments, an absolute value R30 of a smaller radius of curvature of a concave lens included in the third lens group, and a focal length f3 of the third lens group satisfy the following condition (4):

$$0.35 < R30/f3 < 0.8 \quad (4)$$

Using this example, a zoom lens is realized, in which a coma aberration is corrected satisfactorily in rays outside an off-axis principal ray.

In some embodiments, a focal length f4 of the fourth lens group and a focal length fw of an entire system at a wide-angle end satisfy the following conditional expression (5):

$$2.5 < f4/fw < 6.0 \quad (5)$$

Using this example, a miniature zoom lens is realized, which ensures a back-focus enabling a crystal filter, an IR cut filter, and the like to be inserted.

In some embodiments, a surface on the object side of a lens in the fourth lens group is aspherical, and a local radius of curvature R40 in the vicinity of an optical axis and a local radius of curvature R41 in an outer peripheral portion satisfy the following conditional expression (6):

$$1.05 < R41/R40 < 1.75 \qquad (6)$$

Using this example, a zoom lens is realized, in which a coma aberration is corrected satisfactorily in rays inside an off-axis principal ray.

Furthermore, the video camera of the present invention is provided with the zoom lens of the present invention. According to this structure, a miniature video camera of high image quality with a high zoom ratio is realized.

These and other advantages of the present invention will become apparent to those skilled in the art upon reading and understanding the following detailed description with reference to the accompanying figures.

BRIEF DESCRIPTION OF THE DRAWINGS

FIG. 6 illustrates various aberrations at a wide-angle end in Example 1 according to the present invention.

FIG. 8 illustrates various aberrations at a telephoto end in Example 1 according to the present invention.

FIG. 10 illustrates various aberrations at a standard position in Example 2 according to the present invention.

FIG. 11 illustrates various aberrations at a telephoto end in Example 2 according to the present invention.

FIG. 13 illustrates various aberrations at a standard position in Example 3 according to the present invention.

FIG. 14 illustrates various aberrations at a telephoto end in Example 3 according to the present invention.

FIG. 15 illustrates various aberrations at a wide-angle end in Example 4 according to the present invention.

FIG. 17 illustrates various aberrations at a telephoto end in Example 4 according to the present invention.

FIG. 18 illustrates various aberrations at a wide-angle end in Example 5 according to the present invention.

FIG. 19 illustrates various aberrations at a standard position in Example 5 according to the present invention.

FIG. 20 illustrates various aberrations at a telephoto end in Example 5 according to the present invention.

DESCRIPTION OF THE PREFERRED EMBODIMENTS

Hereinafter, the present invention will be described by way of illustrative embodiments with reference to the drawings.

[Embodiment 1]

Figure 1:
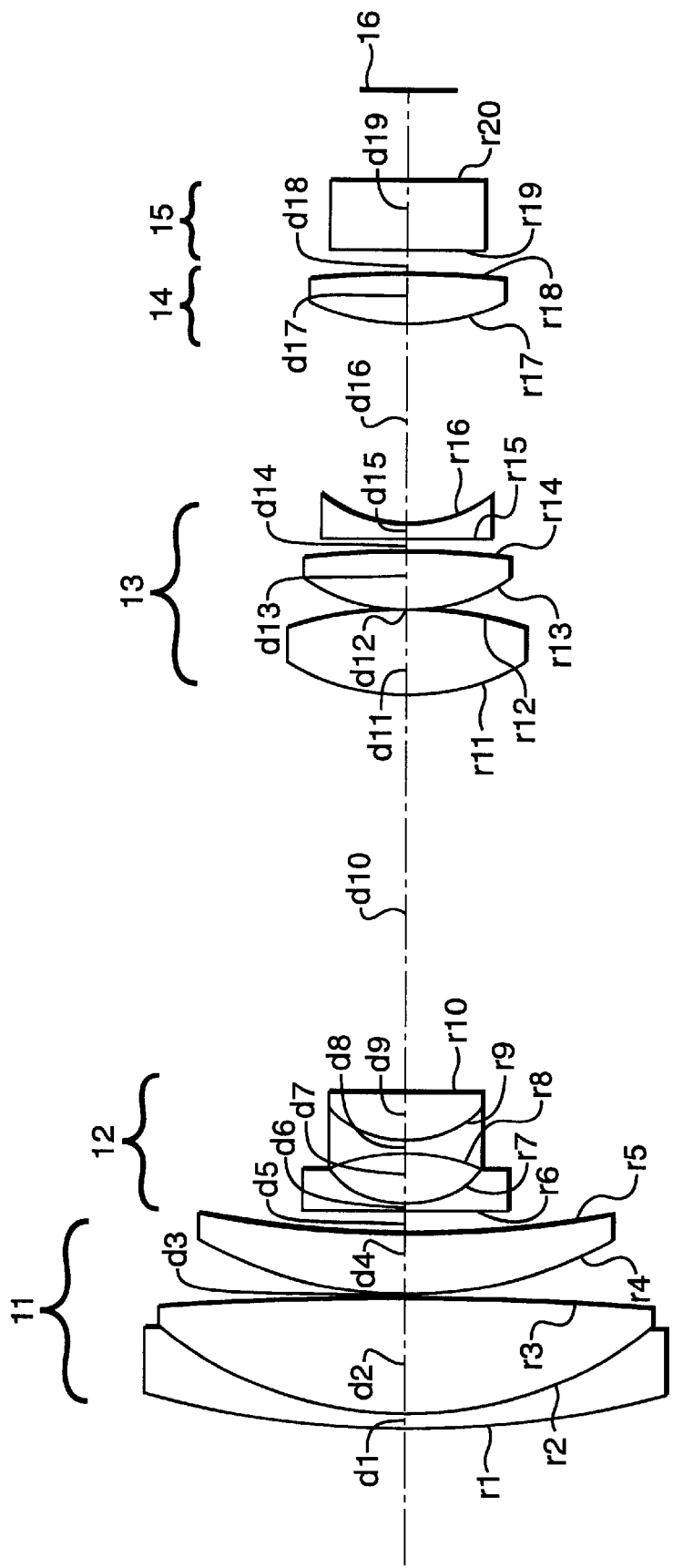
FIG. 1 is a view showing the arrangement of a zoom lens in a first embodiment according to the present invention.

FIG. 1 is a view showing the arrangement of a zoom lens in Embodiment 1 according to the present invention.

As shown in FIG. 1, a zoom lens has a structure in which a first lens group 11, a second lens group 12, a third lens group 13, a fourth lens group 14, and a plate 15 equivalent to an optical low-pass filter and a face plate of a CCD (charge-coupled device) are disposed from an object side (left side in FIG. 1) to an image plane 16 side (right side in FIG. 1) in this order.

The first lens group 11 has positive refracting power, and is fixed with respect to the image plane 16 even in varying power and focusing. The second lens group 12 is composed of three lenses: a first negative lens, a second negative lens, and a positive lens disposed from the object side in this order. The second lens group 12 has negative refracting power as a whole and varies power by moving along an optical axis. The third lens group 13 is composed of three lenses: a positive lens, a positive lens, and a negative lens disposed from the object side in this order, and is fixed with respect to the image plane 16 in varying. power and focusing. The fourth lens group 14 is composed of one positive lens. The fourth lens group 14 moves along an optical axis so as to keep the image plane 16 varied by the movement of the second lens group 12 and the object at a predetermined position from a reference surface, thereby moving an image and adjusting the focus thereof at the same time in accordance with variable power.

It is desirable that the second lens group 12 is composed of three lenses: a first negative lens, a second negative lens, and a positive lens disposed from the object side in this order, and the surface of the second negative lens on the object side is aspherical. Furthermore, it is desirable that a local radius of curvature R10 in the vicinity of the optical axis and a local radius of curvature R11 in an outer peripheral portion satisfy the following conditional expression (1).

$$0.5 < R11/R10 < 0.95 \qquad (1)$$

When R11/R10 is 0.95 or more, a large coma aberration occurs in rays outside an off-axis principal ray at a wide-angle end, and a spherical aberration is not corrected sufficiently at a telephoto end. When R11/R10 is 0.5 or less, a spherical aberration is corrected overly, in particular, at the telephoto end, which makes it impossible to perform satisfactory aberration correction.

Furthermore, it is desirable that a focal length f3 of the third lens group 13 and a focal length fw of an entire system at the wide-angle end satisfy the following conditional expression (2).

$$2.5 < f3/fw < 4.0 \qquad (2)$$

The above conditional expression (2) is related to the power of the third lens group 13. When f3/fw is 2.5 or less, a back-focus, which enables a crystal filter, an IR cut filter, and the like to be inserted, cannot be ensured. When f3/fw is 4.0 or more, the full length of the third lens group 13 becomes long, which makes it impossible to realize a miniature zoom lens.

It is desirable that the third lens group 13 is composed of three lenses: two positive lenses and one negative lens. Because of this lens structure, a miniature zoom lens can be realized, in which a spherical aberration is corrected satisfactorily from the wide-angle end to the standard position.

Furthermore, it is desirable that the surface (on the object side) of a lens disposed closest to the object in the third lens group 13 is aspherical, and a local radius of curvature R20 in the vicinity of an optical axis and a local radius of curvature R21 in an outer peripheral portion satisfy the following conditional expression (3).

$$1.05 < R21/R20 < 3.5 \quad (3)$$

The above conditional expression (3) is related to the aspherical surface (on the object side) of a lens disposed closest to the object in the third lens group 13, and stipulates a range in which a spherical aberration is corrected satisfactorily. When R21/R20 is 1.05 or less, a negative spherical aberration occurs. When R21/R20 is 3.5 or more, excess correction is performed, resulting in occurrence of a positive spherical aberration.

Furthermore, it is desirable that an absolute value R30 of a smaller radius of curvature of a concave lens in the third lens group 13 and a focal length f3 of the third lens group 13 satisfy the following conditional expression (4).

$$0.35 < R30/f3 < 0.8 \quad (4)$$

The above conditional expression (4) stipulates a range in which a coma aberration is corrected satisfactorily in rays outside an off-axis principal ray. When R30/f3 is 0.8 or more, an inward coma occurs at a zooming intermediate position. When R30/f3 is 0.35 or less, an outward coma occurs.

Furthermore, it is desirable that a focal length f4 of the fourth lens group 14 and a focal length fw of an entire system at the wide-angle end satisfy the following conditional expression (5).

$$2.5 < f4/fw < 6.0 \quad (5)$$

The above conditional expression (5) is related to the power of the fourth lens group 14. When f4/fw is 2.5 or less, a back-focus, which enables a crystal filter, an IR cut filter, and the like to be inserted, cannot be ensured. Furthermore, when f4/fw is 6.0 or more, a movement amount of the fourth lens group 14 in focusing becomes large, which makes it impossible to realize a miniature zoom lens.

Furthermore, it is desirable that the surface (on the object side) of a lens in the fourth lens group 14 is aspherical, and a local radius of curvature R40 in the vicinity of an optical axis and a local radius of curvature R41 in an outer peripheral portion satisfy the following conditional expression (6).

$$1.05 < R41/R40 < 1.75 \quad (6)$$

The above conditional expression (6) is related to the aspherical surface (on the object side) of a lens in the fourth lens group 14, and stipulates a range in which a coma aberration is corrected satisfactorily in rays inside an off-axis principal ray. When R41/R40 is 1.05 or less, an inward coma occurs. When R41/R40 is 1.75 or more, an outward coma occurs.

[Embodiment 2]

Figure 2:
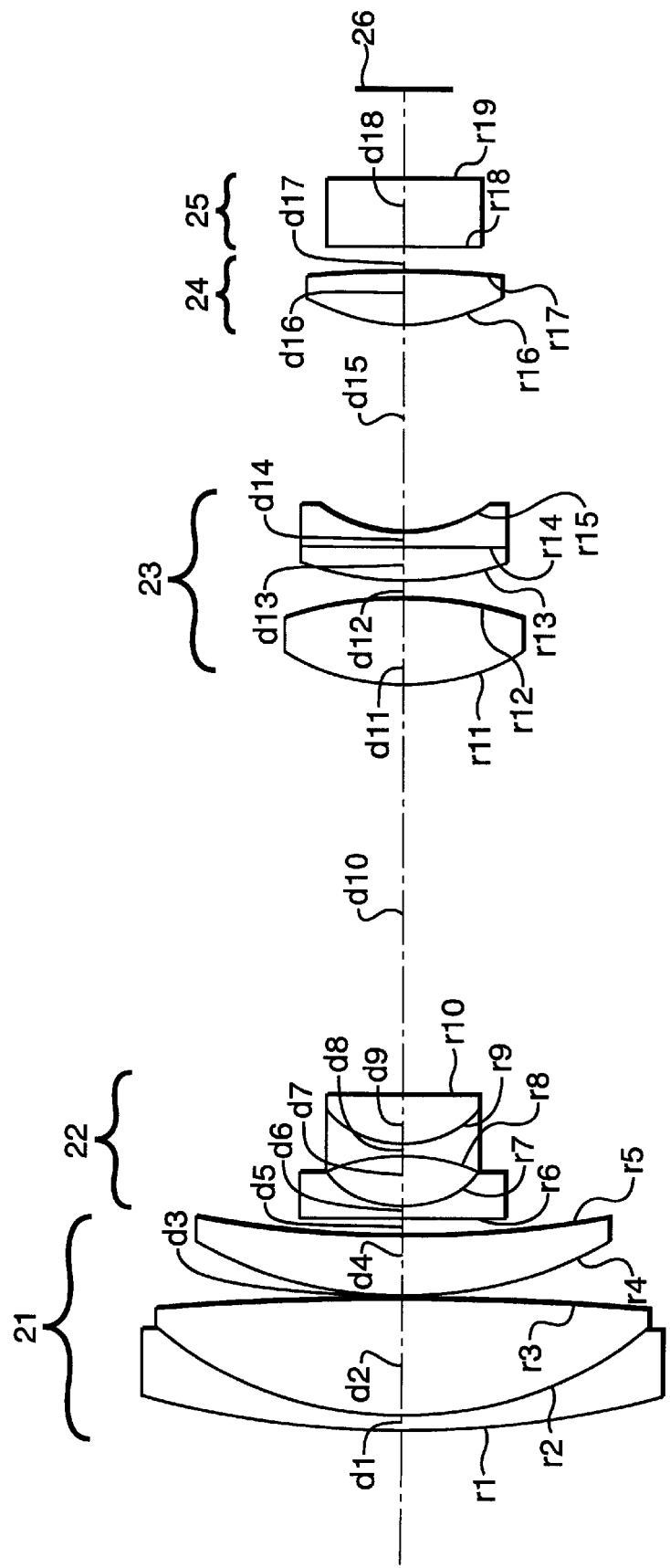
FIG. 2 is a view showing the arrangement of a zoom lens in a second embodiment according to the present invention.

FIG. 2 is a view showing the arrangement of a zoom lens in Embodiment 2 according to the present invention.

As shown in FIG. 2, a zoom lens has a structure in which a first lens group 21, a second lens group 22, a third lens group 23, a fourth lens group 24, and a plate 25 equivalent to an optical low-pass filter and a face plate of a CCD are disposed from an object side (left side in FIG. 2) to an image plane 26 side (right side in FIG. 2) in this order.

The first lens group 21 has positive refracting power, and is fixed with respect to the image plane 26 even in varying power and focusing. The second lens group 22 is composed of three lenses: a first negative lens, a second negative lens, and a positive lens disposed from the object side in this order. The second lens group 22 has negative refracting power as a whole and varies power by moving along an optical axis. The third lens group 23 is composed of three lenses: a positive lens, and a cemented lens of a positive lens and a negative lens disposed from the object side in this order, and is fixed with respect to the image plane 16 in varying power and focusing. The fourth lens group 24 is composed of one positive lens. The fourth lens group 24 moves along an optical axis so as to keep the image plane 26 varied by the movement of the second lens group 22 and the object at a predetermined position from a reference surface, thereby moving an image and adjusting the focus thereof at the same time in accordance with variable power.

It is desirable that the zoom lens in the present embodiment satisfies the above-mentioned conditional expressions (1) to (6) in the same way as in Embodiment 1.

[Embodiment 3]

Figure 3:
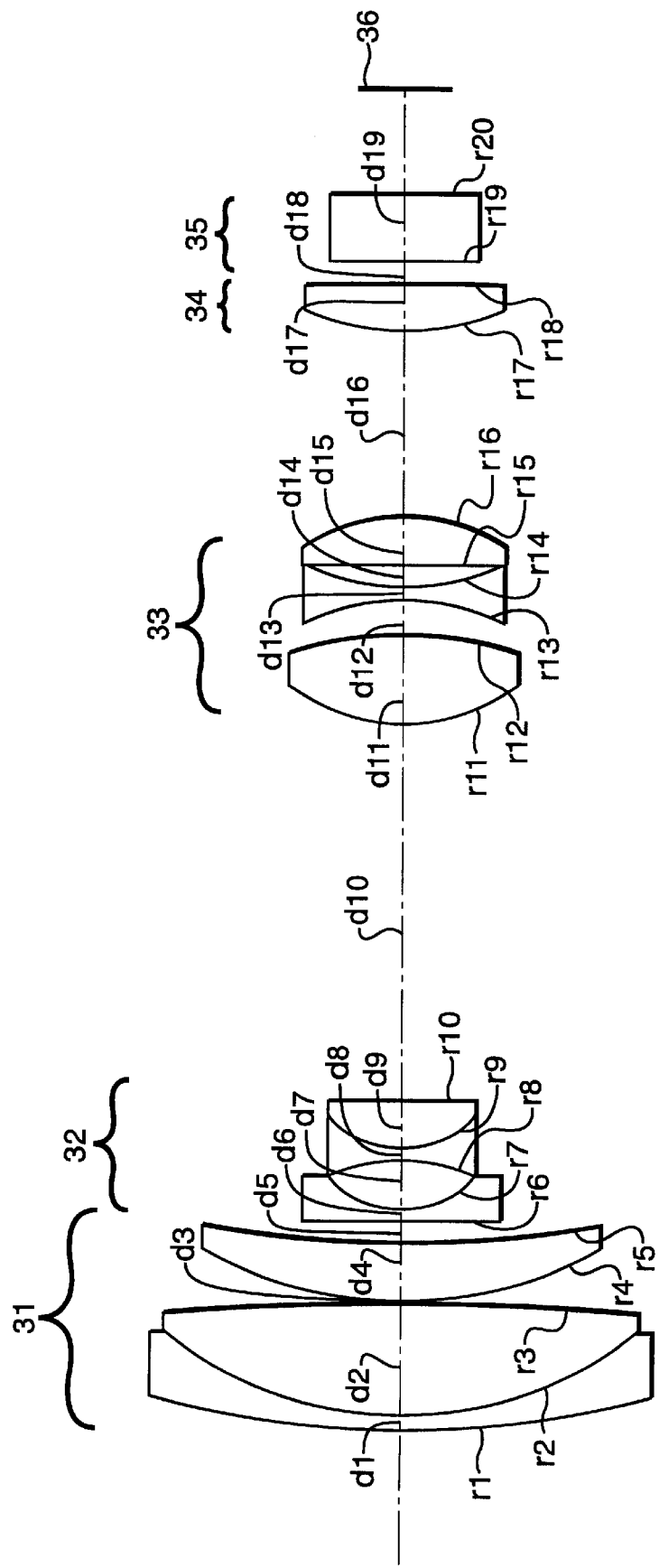
FIG. 3 is a view showing the arrangement of a zoom lens in a third embodiment according to the present invention.

FIG. 3 shows the arrangement of a zoom lens in Embodiment 3 according to the present invention.

As shown in FIG. 3, a zoom lens has a structure in which a first lens group 31, a second lens group 32, a third lens group 33, a fourth lens group 34, and a plate 35 equivalent to an optical low-pass filter and a face plate of a CCD are disposed from an object side (left side in FIG. 3) to an image plane 36 side (right side in FIG. 3) in this order.

The first lens group 31 has positive refracting power, and is fixed with respect to the image plane 36 even in varying power and focusing. The second lens group 32 is composed of three lenses: a first negative lens, a second negative lens, and a positive lens disposed from the object side in this order. The second lens group 32 has negative refracting power as a whole and varies power by moving along an optical axis. The third lens group 33 is composed of three lenses: a positive lens, a negative lens, and a positive lens disposed from the object side in this order, and is fixed with respect to the image plane 36 in varying power and focusing. The fourth lens group 34 is composed of one positive lens. The fourth lens group 34 moves along an optical axis so as to keep an image plane 36 varied by the movement of the second lens group 32 and the object at a predetermined position from a reference surface, thereby moving an image and adjusting the focus thereof at the same time in accordance with variable power.

It is desirable that the zoom lens in the present embodiment satisfies the above-mentioned conditional expressions (1) to (6) in the same way as in Embodiments 1 and 2.

[Embodiment 4]

Figure 4:
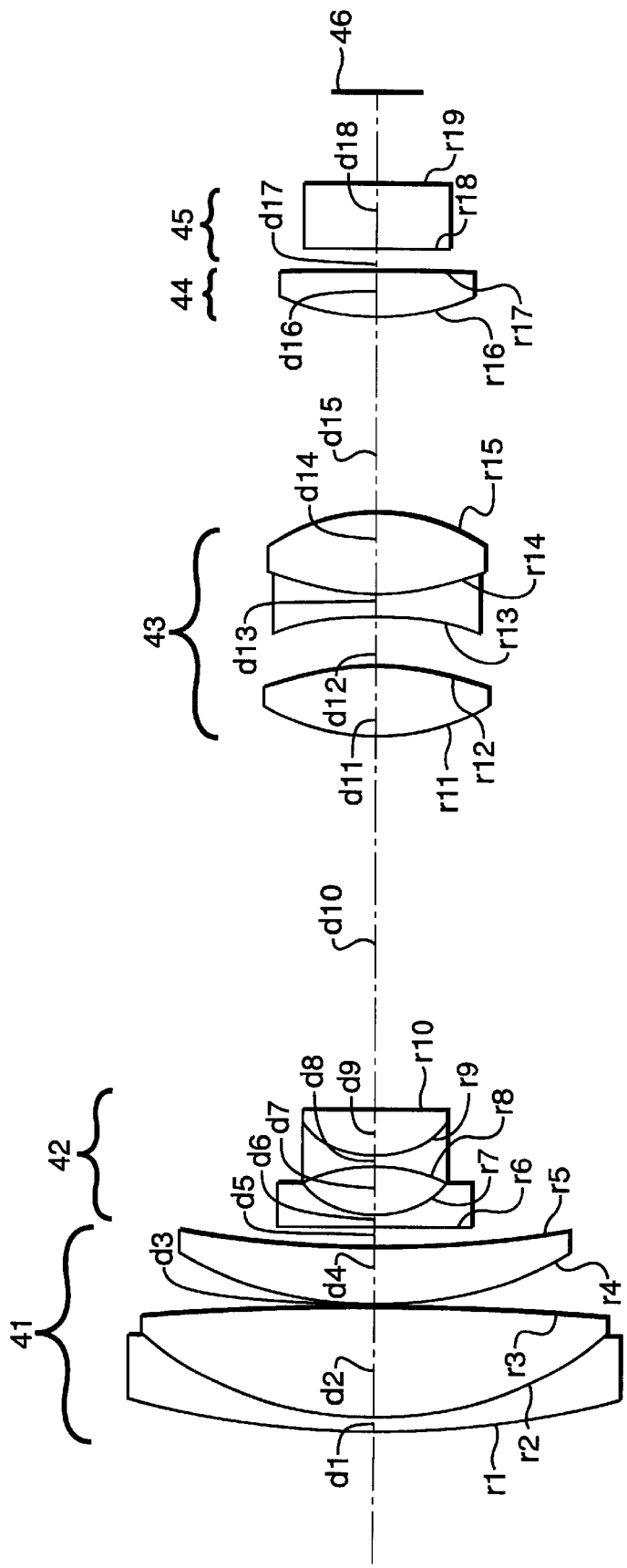
FIG. 4 is a view showing the arrangement of a zoom lens in a fourth embodiment according to the present invention.

FIG. 4 shows the arrangement of a zoom lens in Embodiment 4 according to the present invention.

As shown in FIG. 4, a zoom lens has a structure in which a first lens group 41, a second lens group 42, a third lens group 43, a fourth lens group 44, and a plate 45 equivalent to an optical low-pass filter and a face plate of a CCD are disposed from an object side (left side in FIG. 4) to an image plane 46 side (right side in FIG. 4) in this order.

The first lens group 41 has positive refracting power, and is fixed with respect to the image plane 46 even in varying power and focusing. The second lens group 42 is composed of three lenses: a first negative lens, a second negative lens, and: a positive lens disposed from the object side in this order. The second lens group 42 has negative refracting power as a whole and varies power by moving along an optical axis. The third lens group 43 is composed of three lenses: a positive lens, and a cemented lens of a negative lens and a positive lens disposed from the object side in this order, and is fixed with respect to the image plane 46 in varying power and focusing. The fourth lens group 44 is composed of one positive lens. The fourth lens group 44 moves along an optical axis so as to keep the image plane 46 varied by the movement of the second lens group 42 and the object at a predetermined position from a reference surface, thereby moving an image and adjusting the focus thereof at the same time in accordance with variable power.

It is desirable that the zoom lens in the present embodiment satisfies the above-mentioned conditional expressions (1) to (6) in the same way as in Embodiments 1 to 3.

[Embodiment 5]

Figure 5:
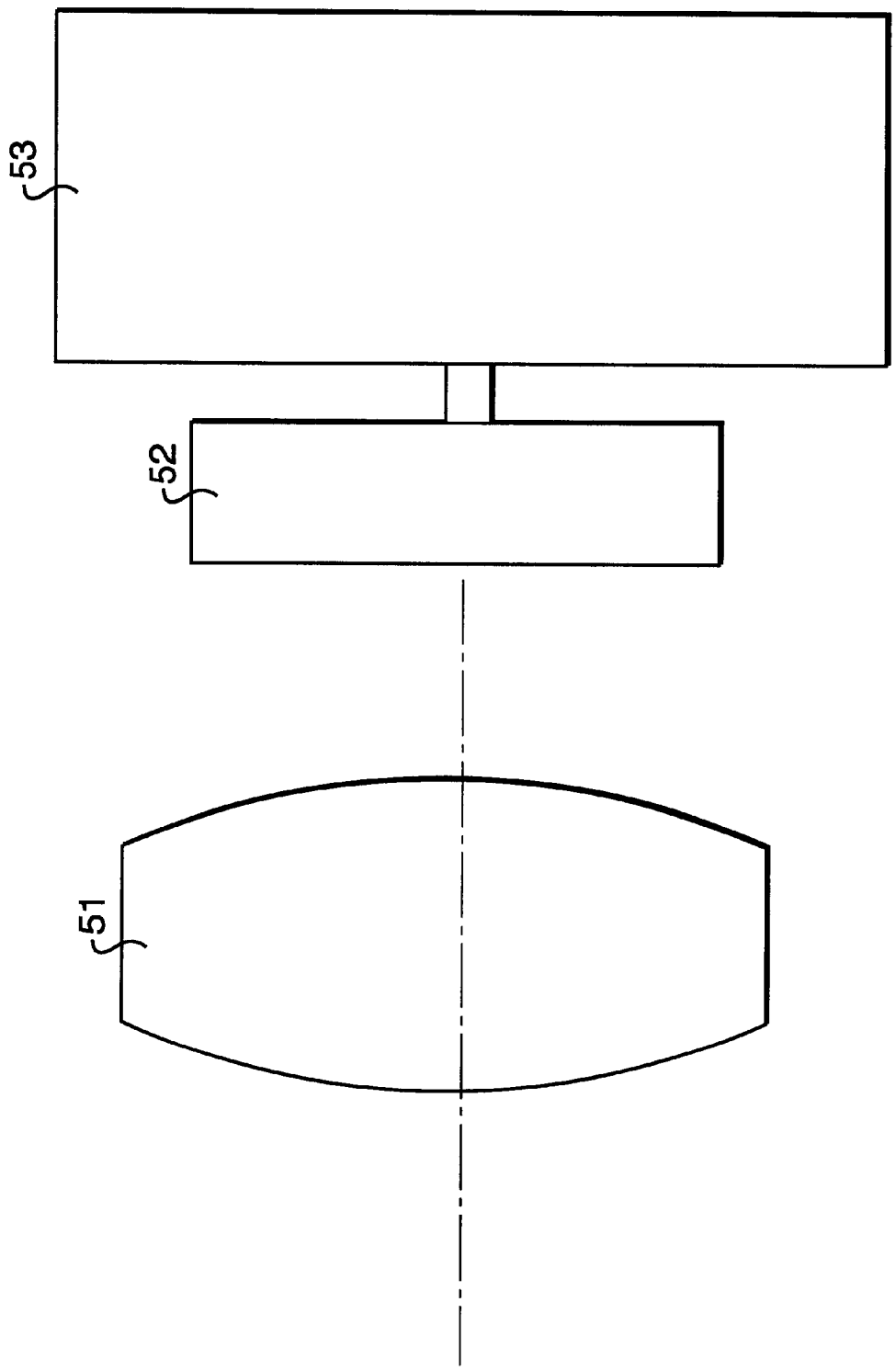
FIG. 5 is a view showing the arrangement of a video camera in a fifth embodiment according to the present invention.
Figure 7E:
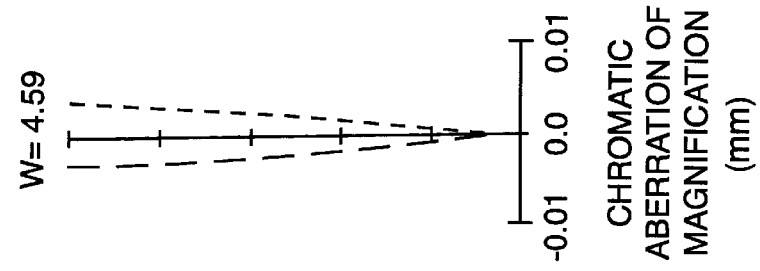
FIG. 7 illustrates various aberrations at a standard position in Example 1 according to the present invention.
Figure 7D:
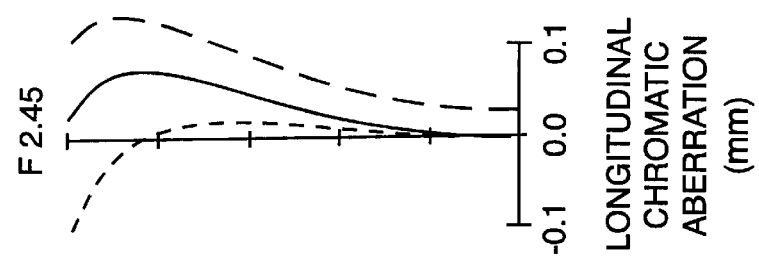
Figure 7C:
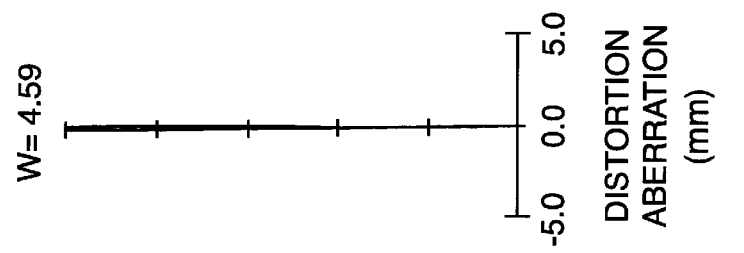
Figure 7B:
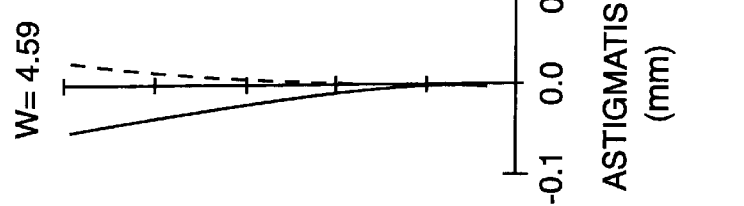
Figure 7A:
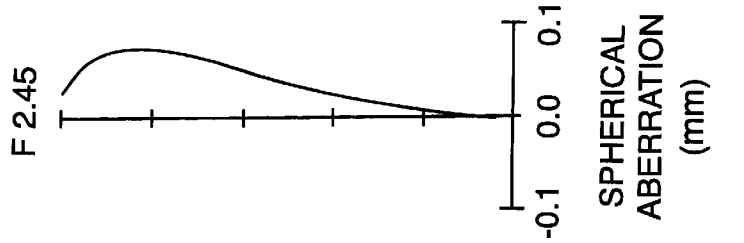
Figure 9E:
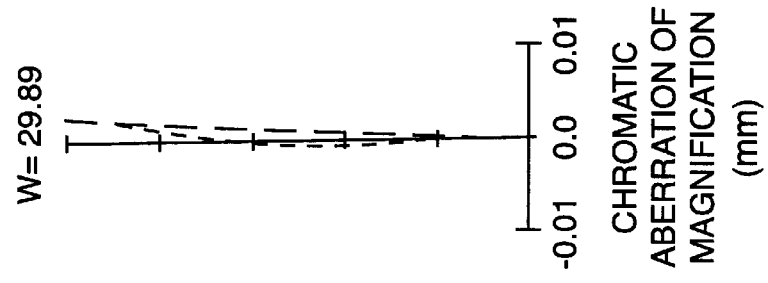
FIG. 9 illustrates various aberrations at a wide-angle end in Example 2 according to the present invention.
Figure 9D:
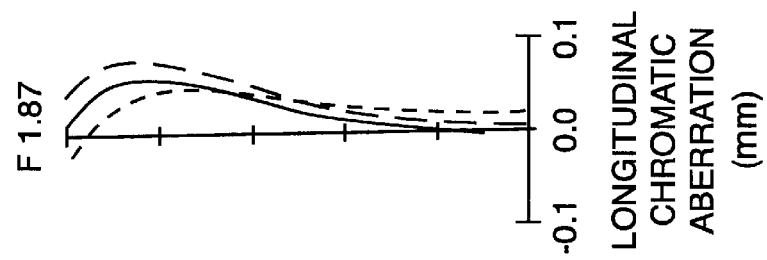
Figure 9C:
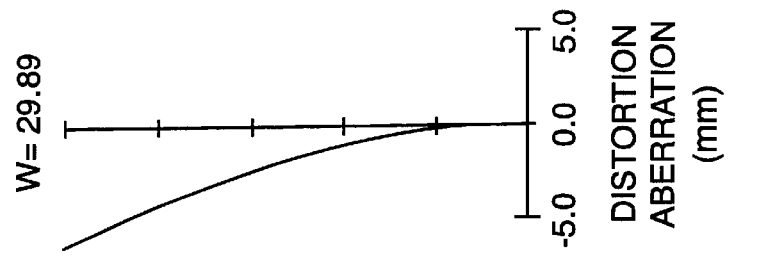
Figure 9B:
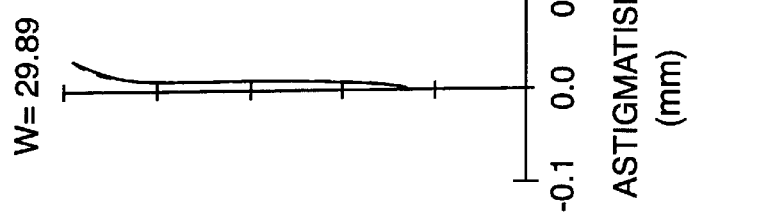
Figure 9A:
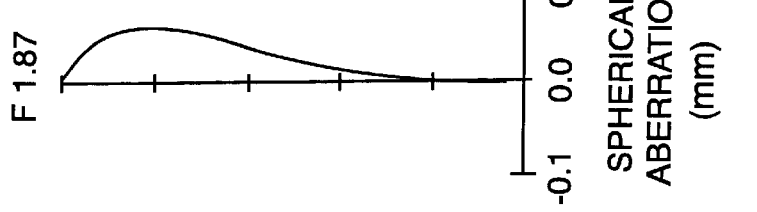

FIG. 5 shows the arrangement of a video camera in Embodiment 5 according to the present invention.

$$SAG = \frac{H^2/R}{1 + \sqrt{1 - (1+K)(H/R)^2}} + D \cdot H^4 + E \cdot H^6 + F \cdot H^8$$

where H is a height from an optical axis, SAG is a distance from the apex on the aspherical surface having a height H from the optical axis, R is a radius of curvature at the apex on the aspherical surface, K is a conical constant, and D, E and F are aspherical coefficients.

The following Table 2 shows aspherical coefficients of the zoom lens in the present example.

TABLE 2

| Surface | 8 | 11 | 12 | 17 |
|---|---|---|---|---|
| K | 2.16598 | −1.01609 | −1.99259 | −1.69352 |
| D | $9.19843 \times 10^{-4}$ | $-1.26963 \times 10^{-4}$ | $1.39183 \times 10^{-4}$ | $1.39165 \times 10^{-4}$ |
| E | $-2.43342 \times 10^{-5}$ | $4.28625 \times 10^{-6}$ | $4.35055 \times 10^{-6}$ | $1.11323 \times 10^{-5}$ |
| F | 0.0 | $8.53637 \times 10^{-8}$ | $1.00886 \times 10^{-7}$ | $-9.40633 \times 10^{-7}$ |

As shown in FIG. 5, the video camera in the present embodiment includes a zoom lens 51, an image pickup device 52, and a signal processing circuit 53. Herein, either one of the zoom lenses in Embodiments 1 to 4 is used as the zoom lens 51. Thus, a miniature video camera of high image quality with a high magnification is realized.

EXAMPLES

Hereinafter, the present invention will be described by way of illustrative examples with reference to the drawings.

Example 1

The following Table 1 shows a specific example of the zoom lens in Embodiment 1.

TABLE 1

| Group | Surface | r | d | n | ν |
|---|---|---|---|---|---|
| 1 | 1 | 35.088 | 0.70 | 1.80518 | 25.5 |
|  | 2 | 15.861 | 4.20 | 1.60311 | 60.7 |
|  | 3 | −169.488 | 0.15 |  |  |
|  | 4 | 14.758 | 2.45 | 1.69680 | 55.6 |
|  | 5 | 46.480 | variable |  |  |
| 2 | 6 | 48.342 | 0.50 | 1.80600 | 40.7 |
|  | 7 | 3.931 | 2.02 |  |  |
|  | 8 | −6.559 | 0.55 | 1.66547 | 55.2 |
|  | 9 | 4.179 | 1.90 | 1.80518 | 25.5 |
|  | 10 | −450.000 | variable |  |  |
| 3 | 11 | 7.869 | 3.25 | 1.51450 | 63.1 |
|  | 12 | −14.227 | 0.10 |  |  |
|  | 13 | 6.937 | 2.20 | 1.51895 | 57.3 |
|  | 14 | −29.395 | 0.50 |  |  |
|  | 15 | −50.017 | 0.50 | 1.80518 | 25.5 |
|  | 16 | 5.348 | variable |  |  |
| 4 | 17 | 7.419 | 2.00 | 1.51450 | 63.1 |
|  | 18 | −25.603 | variable |  |  |
| 5 | 19 | ∞ | 2.60 | 1.51633 | 64.1 |
|  | 20 | ∞ | — |  |  |

In Table 1, r is a radius of curvature (mm) of a lens, d is a thickness of a lense or an air distance (mm) between lenses, n is a refractive index of each lens with respect to a d-line (bright-line having a wavelength of 587.56 nm), and ν is an abbe number of each lens with respect to the d-line. (This also applies to Examples 2 to 5.)

The shape of an aspherical surface is defined by the following equation. (This also applies to Examples 2 to 5.)

The following Table 3 shows an air distance (mm) that is varied by zooming in the case where an object is positioned 2 m away from the tip end of the lens. The standard position in Table 3 is where the third lens group 13 is placed most closely to the fourth lens group 14 In Table 3, f(mm), F/NO, and ω(°) represent a focal length, an F number, and an incident half-angle of view at a wide-angle end, a standard position, and a telephoto end of the zoom lens in Table 1.

TABLE 3

|  | Wide-angle end | Standard position | Telephoto end |
|---|---|---|---|
| f | 3.745 | 24.685 | 52.537 |
| F/NO | 1.871 | 2.453 | 3.082 |
| ω | 29.842 | 4.592 | 2.214 |
| d5 | 0.600 | 11.258 | 13.722 |
| d10 | 14.980 | 4.322 | 1.858 |
| d16 | 7.491 | 1.851 | 5.912 |
| d18 | 1.009 | 6.649 | 2.588 |

As is understood from Table 3, the zoom lens in the present example has a zoom ratio of about 14 times.

In the zoom lens of the present example, the second lens group 12 is composed of three lenses: a first negative lens, a second negative lens, and a positive lens disposed from the object side in this order, and the surface (on the object side) of the second negative lens is aspherical. Furthermore, a local radius of curvature R10 in the vicinity of an optical axis and a local radius of curvature R11 in an outer peripheral portion have the values shown in Table 4.

TABLE 4

| R10 | R11 | Expression (1) |
|---|---|---|
| −6.559 | −4.012 | 0.61 |

More specifically, the above-mentioned conditional expression (1) is satisfied, and a coma aberration at the wide-angle end and a spherical aberration at the telephoto end are corrected satisfactorily.

Furthermore, in: the zoom lens of the present example, a focal length f3 of the third lens group 13 and a focal length fw of the entire system at the wide-angle end have the values shown in Table 5.

TABLE 5

| fw | f3 | Expression (2) |
|---|---|---|
| 3.746 | 11.240 | 3.00 |

More specifically, the above-mentioned conditional expression (2) is satisfied, and a miniature zoom lens is realized, which ensures a back-focus enabling a crystal filter, an IR cut filter, and the like to be inserted.

In the present example, the third lens group 13 is composed of three lenses: two positive lenses and one negative lens. Accordingly, a miniature zoom lens is realized, in which a spherical aberration is corrected satisfactorily from the wide-angle end to the standard position.

Furthermore, in the zoom lens of the present example, the surface (on the object side) of a lens disposed closest to the object in the third lens group 13 is aspherical,: and a local radius of curvature R20 in the vicinity of an optical axis on the surface on the object side and a local radius of curvature R21 in an outer peripheral portion have the values shown in Table 6.

TABLE 6

| R20 | R21 | Expression (3) |
|---|---|---|
| 7.869 | 8.859 | 1.13 |

More specifically, the above-mentioned conditional expression (3) is satisfied, and a zoom lens is realized, in which a spherical aberration in the entire zoom region is corrected satisfactorily.

Furthermore, in the zoom lens of the present example, an absolute value R30 of a smaller radius of curvature of the concave lens in the third lens group 13 and a focal length f3 of the third lens group 13 have the values shown in Table 7.

TABLE 7

| fw | R30 | Expression (4) |
|---|---|---|
| 3.746 | 5.348 | 0.47 |

More specifically, the above-mentioned conditional expression (4) is satisfied, and a zoom lens is realized, in which a coma aberration is corrected satisfactorily in rays outside an off-axis principal ray.

In the zoom lens of the present example, a focal length f4 of the fourth lens group 14 and a focal length fw of the entire system at the wide-angle end have the values shown in Table 8.

TABLE 8

| fw | f4 | Expression (5) |
|---|---|---|
| 3.746 | 11.415 | 3.05 |

More specifically, the above-mentioned conditional expression (5) is satisfied, and a miniature zoom lens is realized, which ensures a back-focus enabling a crystal filter, an IR cut filter, and the like to be inserted.

In the zoom lens of the present example, the surface (on the object side) of a lens in the fourth lens group 14 is aspherical, and a local radius of curvature R40 in the vicinity of an optical axis and a local radius of curvature R41 in an outer peripheral portion have the values shown in Table 9.

TABLE 9

| R40 | R41 | Expression (6) |
|---|---|---|
| 7.419 | 12.280 | 1.66 |

More specifically, the above-mentioned conditional expression (6) is satisfied, and a zoom lens is realized, in which a coma aberration is corrected satisfactorily in rays inside an off-axis principal ray.

FIGS. 6 to 8 show various aberrations at the wide-angle end, the standard position, and the telephoto end of the zoom lens shown in Table 1. In each figure, (a) shows a spherical aberration with respect to a d-line; (b) shows astigmatism, where a solid line represents a curvature of a sagittal image plane, and a broken line represents a curvature of a meridional image plane; (c) shows a distortion aberration; (d) shows a longitudinal chromatic aberration, where a solid line represents values with respect to the d-line, a short broken line represents values with respect to an F-line (bright-line having a wavelength of 486.13 nm), and a long broken line represents values with respect to a C-line (bright-line having a wavelength of 656.28 nm); and (e) shows a chromatic aberration of magnification, where a short broken line represents values with respect to the F-line, and a long broken line represents values with respect to the C-line. This also applies to FIGS. 9 to 20.

As is understood from FIGS. 6 to 8, the zoom lens in the present example exhibits satisfactory aberration performance.

Example 2

The following Table 10 shows a specific example of the zoom lens in Embodiment 2.

TABLE 10

| Group | Surface | r | d | n | ν |
|---|---|---|---|---|---|
| 1 | 1 | 33.250 | 0.70 | 1.80518 | 25.5 |
|  | 2 | 16.150 | 4.10 | 1.60311 | 60.7 |
|  | 3 | −121.024 | 0.15 |  |  |
|  | 4 | 14.261 | 2.35 | 1.60311 | 60.7 |
|  | 5 | 42.353 | variable |  |  |
| 2 | 6 | 42.353 | 0.50 | 1.80600 | 40.7 |
|  | 7 | 4.089 | 1.97 |  |  |
|  | 8 | −6.325 | 0.60 | 1.66547 | 55.2 |
|  | 9 | 4.388 | 1.90 | 1.80518 | 25.5 |
|  | 10 | −274.744 | variable |  |  |
| 3 | 11 | 6.510 | 3.55 | 1.60602 | 57.4 |
|  | 12 | −10.819 | 0.57 |  |  |
|  | 13 | 11.074 | 1.40 | 1.51633 | 64.1 |
|  | 14 | −350.000 | 0.50 | 1.84666 | 23.9 |
|  | 15 | 5.629 | variable |  |  |
| 4 | 16 | 7.425 | 2.05 | 1.51450 | 63.1 |
|  | 17 | −32.443 | variable |  |  |
| 5 | 18 | ∞ | 2.60 | 1.51633 | 64.1 |
|  | 19 | ∞ | — |  |  |

The following Table 11 shows aspherical coefficients of the zoom lens in the present example.

TABLE 11

| Surface | 8 | 11 | 12 | 16 |
|---|---|---|---|---|
| K | 1.40916 | −1.21032 | −5.03009 | 9.90801 |
| D | $6.09570 \times 10^{-4}$ | $-7.12512 \times 10^{-5}$ | $1.36784 \times 10^{-5}$ | $-4.50292 \times 10^{-4}$ |
| E | $-3.78572 \times 10^{-5}$ | $-9.78022 \times 10^{-7}$ | $-1.49776 \times 10^{-6}$ | $-2.24956 \times 10^{-5}$ |
| F | 0.0 | 0.0 | 0.0 | 0.0 |

The following Table 12 shows an air distance (mm) that is varied by zooming in the case where an object is positioned 2 m away from the tip end of the lens.

TABLE 12

| | Wide-angle end | Standard position | Telephoto end |
|---|---|---|---|
| f | 3.731 | 23.542 | 51.618 |
| F/NO | 1.873 | 2.296 | 3.078 |
| ω | 29.888 | 4.821 | 2.246 |
| d5 | 0.600 | 11.578 | 14.101 |
| d10 | 15.352 | 4.374 | 1.851 |
| d15 | 7.813 | 2.252 | 6.088 |
| d17 | 1.010 | 6.571 | 2.735 |

As is understood from Table 12, the zoom lens in the present example has a zoom ratio of about 14 times.

In the zoom lens of the present example, the surface on the object side of the second negative lens in the second lens group 22 is aspherical, and a local radius of curvature R10 in the vicinity of an optical axis and a local radius of curvature R11 in an outer peripheral portion have the values shown in Table 13.

TABLE 13

| R10 | R11 | Expression (1) |
|---|---|---|
| −6.325 | −4.338 | 0.69 |

More specifically, the above-mentioned conditional expression (1) is satisfied, and a coma aberration at the wide-angle end and a spherical aberration at the telephoto end are corrected satisfactorily.

Furthermore, in the zoom lens of the present example, a focal length f3 of the third lens group 23 and a focal length fw of the entire system at the wide-angle end have the values shown in Table 14

TABLE 14

| fw | f3 | Expression (2) |
|---|---|---|
| 3.732 | 10.702 | 2.87 |

More specifically, the above-mentioned conditional expression (2) is satisfied, and a miniature zoom lens is realized, which ensures a back-focus enabling a crystal filter, an IR cut filter, and the like to be inserted.

In the present example, the third lens group 23 is composed of three lenses: a positive lens, and a cemented lens of a positive lens and a negative lens disposed from the object side in this order. Accordingly, a miniature zoom lens is realized, in which a spherical aberration is corrected satisfactorily from the wide-angle end to the standard position.

Furthermore, in the zoom lens of the present example, the surface (on the object side) of a lens disposed closest to the object in the third lens group 23 is aspherical, and a local radius of curvature R20 in the vicinity of an optical axis on the surface of the lens on the object side and a local radius of curvature R21 in an outer peripheral portion have the values shown in Table 15.

TABLE 15

| R20 | R21 | Expression (3) |
|---|---|---|
| 6.510 | 14.327 | 2.20 |

More specifically, the above-mentioned conditional expression (3) is satisfied, and a zoom lens is realized, in which a spherical aberration in the entire zoom region is corrected satisfactorily.

Furthermore, in the zoom lens of the present example, an absolute value R30 of a smaller radius of curvature of the concave lens in the third lens group 23 and a focal length f3 of the third lens group 23 have the values shown in Table 16.

TABLE 16

| fw | R30 | Expression (4) |
|---|---|---|
| 3.732 | 5.629 | 0.53 |

More specifically, the above-mentioned conditional expression (4) is satisfied, and a zoom lens is realized, in which a coma aberration is corrected satisfactorily in rays outside an off-axis principal ray.

In the zoom lens of the present example, a focal length f4 of the fourth lens group 24 and a focal length fw of the entire system at the wide-angle end have the values shown in Table 17.

TABLE 17

| fw | f4 | Expression (5) |
|---|---|---|
| 3.732 | 11.953 | 3.20 |

More specifically, the above-mentioned conditional expression (5) is satisfied, and a miniature zoom lens is realized, which ensures a back-focus enabling a crystal filter, an IR cut filter, and the like to be inserted.

In the zoom lens of the present example, the surface (on the object side) of a lens in the fourth lens group 24 is aspherical, and a local radius of curvature R40 in the vicinity of an optical axis and a local radius of curvature R41 in an outer peripheral portion have the values shown in Table 18.

TABLE 18

| R40 | R41 | Expression (6) |
|---|---|---|
| 7.425 | 8.972 | 1.21 |

More specifically, the above-mentioned conditional expression (6) is satisfied, and a zoom lens is realized, in which a coma aberration is corrected satisfactorily in rays inside an off-axis principal ray.

FIGS. 9 to 11 show various aberrations at the wide-angle end, the standard position, and the telephoto end of the zoom lens shown in Table 10.

As is understood from FIGS. 9 to 11, the zoom lens of the present example exhibits satisfactory aberration performance.

Example 3

The following Table 19 shows another specific example of the zoom lens in Embodiment 2.

TABLE 19

| Group | Surface | r | d | n | ν |
|---|---|---|---|---|---|
| 1 | 1 | 49.919 | 0.70 | 1.80518 | 25.5 |
|  | 2 | 19.615 | 4.40 | 1.60311 | 60.7 |
|  | 3 | −92.408 | 0.15 |  |  |
|  | 4 | 17.095 | 2.60 | 1.69680 | 55.6 |
|  | 5 | 47.364 | variable |  |  |
| 2 | 6 | 47.364 | 0.65 | 1.77250 | 49.6 |
|  | 7 | 4.347 | 1.99 |  |  |
|  | 8 | −6.281 | 0.60 | 1.66547 | 55.2 |
|  | 9 | 5.246 | 1.60 | 1.80518 | 25.5 |
|  | 10 | −71.950 | variable |  |  |
| 3 | 11 | 6.341 | 3.90 | 1.60602 | 57.4 |
|  | 12 | −12.810 | 0.10 |  |  |
|  | 13 | 12.499 | 1.50 | 1.60602 | 57.4 |
|  | 14 | −350.000 | 0.50 | 1.80518 | 25.5 |
|  | 15 | 5.155 | variable |  |  |
| 4 | 16 | 7.723 | 2.16 | 1.51450 | 63.1 |
|  | 17 | −51.103 | variable |  |  |
| 5 | 18 | ∞ | 3.20 | 1.51633 | 64.1 |
|  | 19 | ∞ | — |  |  |

The following Table 20 shows aspherical coefficients of the zoom lens in the present example.

TABLE 20

| Surface | 8 | 11 | 12 | 16 |
|---|---|---|---|---|
| K | −4.21638 | −8.91691 × 10$^{-1}$ | −8.21468 | 4.94005 × 10$^{-1}$ |
| D | −2.03538 × 10$^{-3}$ | −1.07243 × 10$^{-4}$ | −1.37381 × 10$^{-5}$ | −2.05520 × 10$^{-4}$ |
| E | 8.45995 × 10$^{-6}$ | −7.16355 × 10$^{-7}$ | −1.74784 × 10$^{-7}$ | −1.05605 × 10$^{-5}$ |
| F | 0.0 | 0.0 | 0.0 | 0.0 |

The following Table 21 shows an air distance (mm) that is varied by zooming in the case where an object is disposed at an infinite position from the tip end of the lens.

TABLE 21

|  | Wide-angle end | Standard position | Telephoto end |
|---|---|---|---|
| f | 3.741 | 27.013 | 67.711 |
| F/NO | 1.853 | 2.359 | 3.530 |
| ω | 29.978 | 4.202 | 1.671 |
| d5 | 0.600 | 13.989 | 17.136 |
| d10 | 18.620 | 5.231 | 2.084 |
| d15 | 9.110 | 2.372 | 9.110 |
| d17 | 1.000 | 7.738 | 1.000 |

As is understood from Table 21, the zoom lens in the present example has a zoom ratio of about 18 times.

In the zoom lens of the present example, the surface on the object side of the second negative lens in the second lens group 22 is aspherical, and a local radius of curvature R10 in the vicinity of an optical axis and a local radius of curvature R11 in an outer peripheral portion have the values shown in Table 22.

TABLE 22

| R10 | R11 | Expression (1) |
|---|---|---|
| −6.281 | −5.725 | 0.91 |

More specifically, the above-mentioned conditional expression (1) is satisfied, and a coma aberration at the wide-angle end and a spherical aberration at the telephoto end can be corrected satisfactorily.

Furthermore, in the zoom lens of the present example, a focal length f3 of the third lens group 23 and a focal length fw of the entire system at the wide-angle end have the values shown in Table 23.

TABLE 23

| fw | f3 | Expression (2) |
|---|---|---|
| 3.741 | 12.177 | 3.26 |

More specifically, the above-mentioned conditional expression (2) is satisfied. Accordingly, a miniature zoom lens is realized, which ensures a back-focus enabling a crystal filter, an IR cut filter, and the like to be inserted.

In the present example, the third lens group 23 is composed of three lenses: a positive lens, and a cemented lens of a positive lens and a negative lens disposed from the object side in this order. Accordingly, a miniature zoom lens is realized, in which a spherical aberration is corrected satisfactorily from the wide-angle end to the standard position.

Furthermore, in the zoom lens of the present example, the surface (on the object side) of a lens disposed closest to the object in the third lens group 23 is aspherical, and a local radius of curvature R20 in the vicinity of an optical axis on the surface of the lens on the object side and a local radius of curvature R21 in an outer peripheral portion have the values shown in Table 24.

TABLE 24

| R20 | R21 | Expression (3) |
|---|---|---|
| 6.341 | 13.970 | 2.20 |

More specifically, the above-mentioned conditional expression (3) is satisfied, and a zoom lens is realized, in which a spherical aberration in the entire zoom region is corrected satisfactorily.

Furthermore, in the zoom lens of the present example, an absolute value R30 of a smaller radius of curvature of the concave lens in the third lens group 23 and a focal length f3 of the third lens group 23 have the values shown in Table 25.

TABLE 25

| fw | R30 | Expression (4) |
|---|---|---|
| 3.741 | 5.155 | 0.42 |

More specifically, the above-mentioned conditional expression (4) is satisfied, and a zoom lens is realized, in which a coma aberration is corrected satisfactorily in rays outside an off-axis principal ray.

In the zoom lens of the present example, a focal length f4 of the fourth lens group 24 and a focal length fw of the entire system at the wide-angle end have the values shown in Table 26.

TABLE 26

| fw | f4 | Expression (5) |
|---|---|---|
| 3.741 | 13.204 | 3.53 |

More specifically, the above-mentioned conditional expression (5) is satisfied. Accordingly, a miniature zoom lens is realized, which ensures a back-focus enabling a crystal filter, an IR cut filter, and the like to be inserted.

In the zoom lens of the present example, the surface (on the object side) of a lens in the fourth lens group 24 is aspherical, and a local radius of curvature R40 in the vicinity of an optical axis and a local radius of curvature R41 in an outer peripheral portion have the values shown in Table 27.

TABLE 27

| R40 | R41 | Expression (6) |
|---|---|---|
| 7.723 | 9.330 | 1.21 |

More specifically, the above-mentioned conditional expression (6) is satisfied, and a zoom lens is realized, in which a coma aberration is corrected satisfactorily in rays inside an off-axis principal ray.

Figures 12A, 12B, 12C, 12D, 12E:
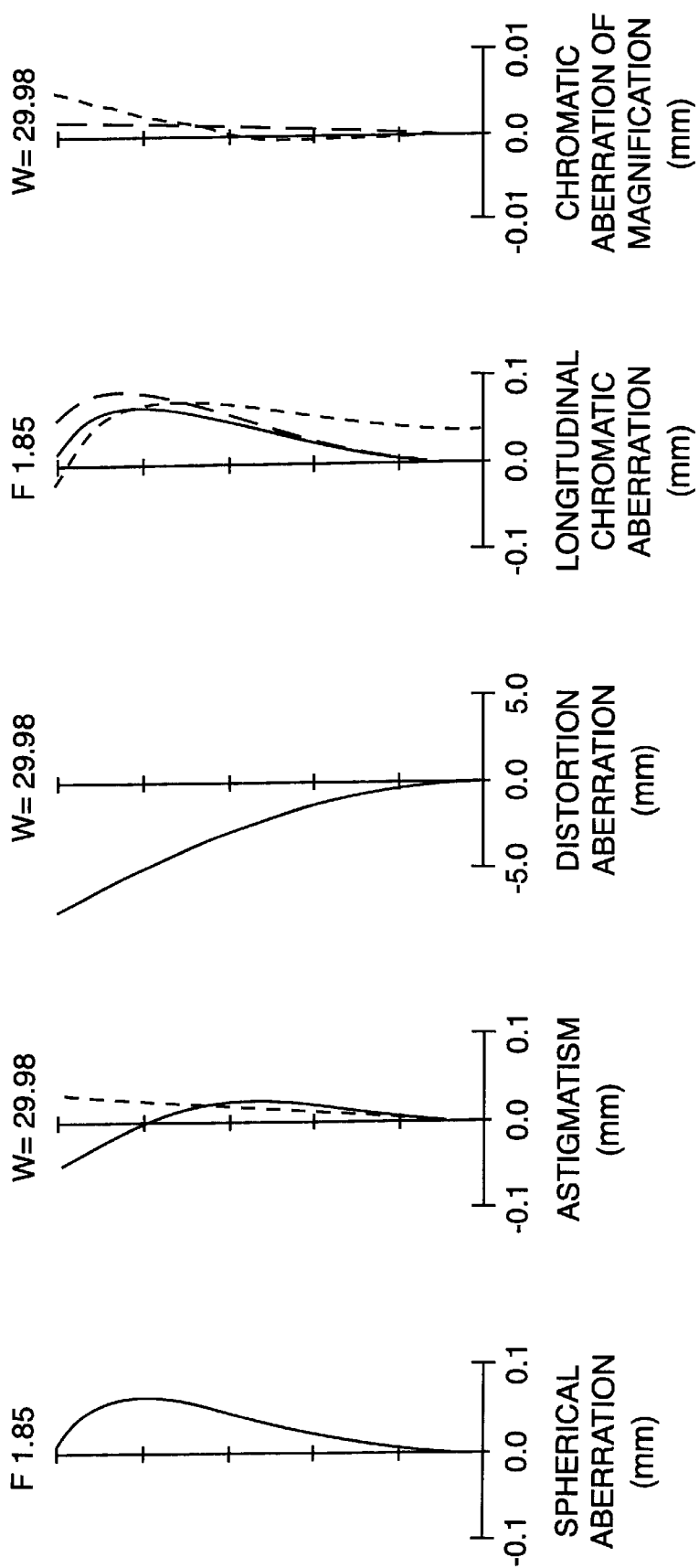
FIG. 12 illustrates various aberrations at a wide-angle end in Example 3 according to the present invention.

FIGS. 12 to 14 show various aberrations at the wide-angle end, the standard position, and the telephoto end of the zoom lens shown in Table 19.

As is understood from FIGS. 12 to 14, the zoom lens of the present example exhibits satisfactory aberration performance.

Example 4

The following Table 28 shows a specific example of the zoom lens in Embodiment 3.

TABLE 28

| Group | Surface | r | d | n | ν |
|---|---|---|---|---|---|
| 3 | 11 | 6.944 | 3.50 | 1.60602 | 57.4 |
|  | 12 | −11.030 | 1.35 |  |  |
|  | 13 | −8.593 | 0.50 | 1.76182 | 26.5 |
|  | 14 | 12.115 | 0.61 |  |  |
|  | 15 | −486.326 | 2.00 | 1.51633 | 64.1 |
|  | 16 | −6.997 | variable |  |  |
| 4 | 17 | 8.848 | 1.90 | 1.51450 | 63.1 |
|  | 18 | −486.662 | variable |  |  |
| 5 | 19 | ∞ | 2.60 | 1.51633 | 64.1 |
|  | 20 | ∞ | — |  |  |

The first lens group 31 and the second lens group 32 of the present example are the same as those in Example 1 shown in Table 1.

The following Table 29 shows aspherical coefficients of the zoom lens in the present example.

TABLE 29

| Surface | 11 | 12 | 17 |
|---|---|---|---|
| K | −1.60285 | −1.93730 | $-5.23866 \times 10^{-1}$ |
| D | $3.26669 \times 10^{-4}$ | $2.49392 \times 10^{-4}$ | $1.57946 \times 10^{-5}$ |
| E | $-1.36801 \times 10^{-6}$ | $-3.98746 \times 10^{-6}$ | $-1.12795 \times 10^{-6}$ |
| F | $2.37367 \times 10^{-7}$ | $1.42772 \times 10^{-7}$ | $-4.55207 \times 10^{-8}$ |

The following Table 30 shows an air distance (mm) that is varied by zooming in the case where an object is disposed 2 m away from the tip end of the lens.

TABLE 30

|  | Wide-angle end | Standard position | Telephoto end |
|---|---|---|---|
| f | 3.698 | 22.952 | 52.326 |
| F/NO | 1.858 | 2.268 | 3.061 |
| ω | 30.336 | 4.975 | 2.233 |
| d16 | 7.491 | 1.723 | 5.790 |
| d18 | 1.009 | 6.777 | 2.710 |

As is understood from Table 30, the zoom lens in the present example has a zoom ratio of about 14 times.

Furthermore, in the zoom lens of the present example, a focal length f3 of the third lens group 33 and a focal length fw of the entire system at the wide-angle end have the values shown in Table 31.

TABLE 31

| fw | f3 | Expression (2) |
|---|---|---|
| 3.699 | 13.068 | 3.53 |

More specifically, the above-mentioned conditional expression (2) is satisfied, and a miniature zoom lens is realized, which ensures a back-focus enabling a crystal filter, an IR cut filter, and the like to be inserted.

In the present example, the third lens group 33 is composed of three lenses: a positive lens, a negative lens, and a positive lens disposed from the object side in this order. Accordingly, a miniature zoom lens is realized, in which a spherical aberration is corrected satisfactorily from the wide-angle end to the standard position.

Furthermore, in the zoom lens of the present example, the surface (on the object side) of a lens disposed closest to the object in the third lens group 33 is aspherical, and a local radius of curvature R20 in the vicinity of an optical axis on the surface of the lens on the object side and a local radius of curvature R21 in an outer peripheral portion have the values shown in Table 32.

TABLE 32

| R20 | R21 | Expression (3) |
|---|---|---|
| 6.944 | 7.408 | 1.07 |

More specifically, the above-mentioned conditional expression (3) is satisfied, and a zoom lens is realized, in which a spherical aberration in the entire zoom region is corrected satisfactorily.

Furthermore, in the zoom lens of the present example, an absolute value R30 of a smaller radius of curvature of the concave lens in the third lens group 33 and a focal length f3 of the third lens group 33 have the values shown in Table 33.

TABLE 33

| fw | R30 | Expression (4) |
|---|---|---|
| 3.699 | 8.593 | 0.66 |

More specifically, the above-mentioned conditional expression (4) is satisfied, and a zoom lens is realized, in which a coma aberration is corrected satisfactorily in rays outside an off-axis principal ray.

In the zoom lens of the present example, a focal length f4 of the fourth lens group 34 and a focal length fw of the entire system at the wide-angle end have the values shown in Table 34.

TABLE 34

| fw | f4 | Expression (5) |
|---|---|---|
| 3.699 | 16.912 | 4.57 |

More specifically, the above-mentioned conditional expression (5) is satisfied, and a miniature zoom lens is realized, which ensures a back-focus enabling a crystal filter, an IR cut filter, and the like to be inserted.

In the zoom lens of the present example, the surface (on the object side) of a lens in the fourth lens group 34 is aspherical, and a local radius of curvature R40 in the vicinity of an optical axis and a local radius of curvature R41 in an outer peripheral portion have the values shown in Table 35.

TABLE 35

| R40 | R41 | Expression (6) |
|---|---|---|
| 8.848 | 10.716 | 1.21 |

More specifically, the above-mentioned conditional expression (6) is satisfied, and a zoom lens is realized, in which a coma aberration is corrected satisfactorily in rays inside an off-axis principal ray.

Figures 16A, 16B, 16C, 16D, 16E:
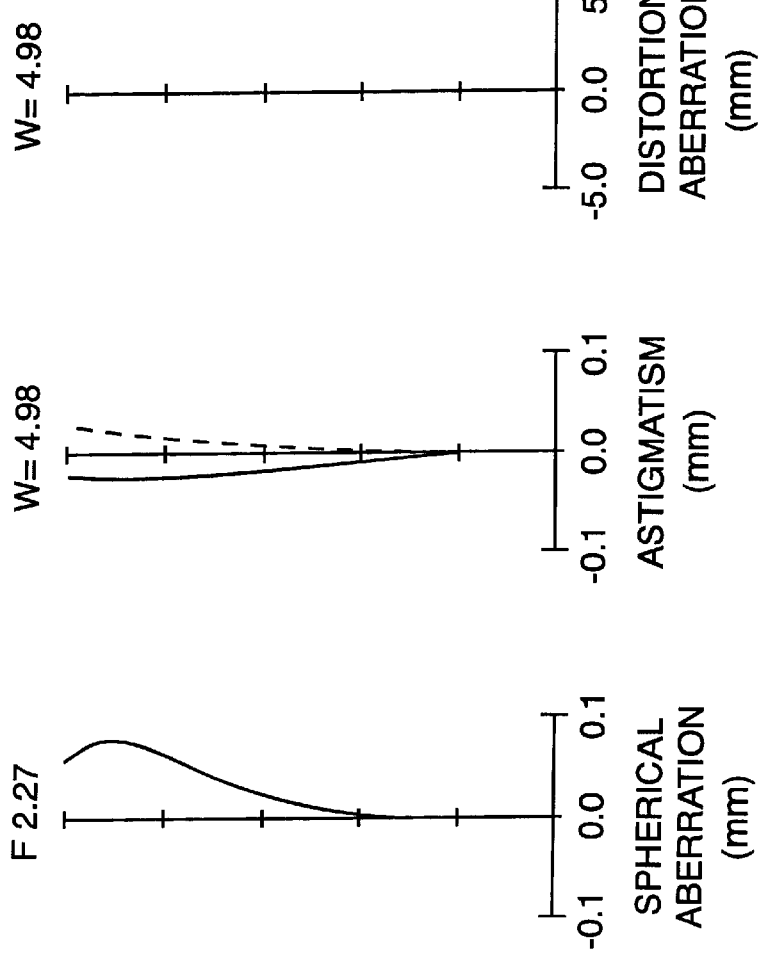
FIG. 16 illustrates various aberrations at a standard position in Example 4 according to the present invention.

FIGS. 15 to 17 show various aberrations at the wide-angle end, the standard position, and the telephoto end of the zoom lens shown in Table 28.

As is understood from FIGS. 15 to 17, the zoom lens of the present example exhibits satisfactory aberration performance.

Example 5

The following Table 36 shows another specific example of the zoom lens in Embodiment 4.

TABLE 36

| Group | Surface | r | d | n | ν |
|---|---|---|---|---|---|
| 3 | 11 | 9.022 | 2.80 | 1.51450 | 63.1 |
|   | 12 | −11.574 | 2.09 |  |  |
|   | 13 | −14.500 | 0.80 | 1.75520 | 27.5 |
|   | 14 | 9.153 | 3.30 | 1.53358 | 51.6 |
|   | 15 | −9.134 | variable |  |  |
| 4 | 16 | 9.800 | 1.80 | 1.51450 | 63.1 |
|   | 17 | 211.668 | variable |  |  |
| 5 | 18 | ∞ | 2.60 | 1.51633 | 64.1 |
|   | 19 | ∞ | — |  |  |

The first lens group 41 and the second lens group 42 of the present example are the same as those in Example 1 shown in Table 1.

The following Table 37 shows aspherical coefficients of the zoom lens in the present example.

TABLE 37

| Surface | 11 | 16 |
|---|---|---|
| K | −1.46040 | −2.57376 × $10^{-1}$ |
| D | −3.08974 × $10^{-4}$ | −9.44773 × $10^{-5}$ |
| E | 1.31629 × $10^{-6}$ | 2.49141 × $10^{-6}$ |
| F | 0.0 | 0.0 |

The following Table 38 shows an air distance (mm) that is varied by zooming in the case where an object is disposed 2 m away from the tip end of the lens.

TABLE 38

|  | Wide-angle end | Standard position | Telephoto end |
|---|---|---|---|
| f | 3.647 | 21.845 | 51.317 |
| F/NO | 1.856 | 2.155 | 2.996 |
| ω | 30.798 | 5.229 | 2.279 |
| d15 | 7.990 | 1.958 | 6.114 |
| d17 | 1.010 | 7.042 | 2.886 |

As is understood from Table 38, the zoom lens in the present example has a zoom ratio of about 14 times.

Furthermore, in the zoom lens of the present example, a focal length f3 of the third lens group 43 and a focal length fw of the entire system at the wide-angle end have the values shown in Table 39.

TABLE 39

| fw | f3 | Expression (2) |
|---|---|---|
| 3.647 | 12.845 | 3.52 |

More specifically, the above-mentioned conditional expression (2) is satisfied, and a miniature zoom lens is realized, which ensures a back-focus enabling a crystal filter, an IR cut filter, and the like to be inserted.

In the present example, the third lens group 43 is composed of three lenses: a positive lens, and a cemented lens of a negative lens and a positive lens disposed from the object side in this order. Accordingly, a miniature zoom lens is realized, in which a spherical aberration is corrected satisfactorily from the wide-angle end to the standard position.

Furthermore, in the zoom lens of the present example, the surface (on the object side) of a lens disposed closest to the object in the third lens group 43 is aspherical, and a local radius of curvature R20 in the vicinity of an optical axis on the surface of the lens on the object side and a local radius of curvature R21 in an outer peripheral portion have the values shown in Table 40.

TABLE 40

| R20 | R21 | Expression (3) |
|---|---|---|
| 9.022 | 26.310 | 2.92 |

More specifically, the above-mentioned conditional expression (3) is satisfied, and a zoom lens is realized, in which a spherical aberration in the entire zoom region is corrected satisfactorily.

Furthermore, in the zoom lens of the present example, an absolute value R30 of a smaller radius of curvature of the concave lens in the third lens group 43 and a focal length f3 of the third lens group 43 have the values shown in Table 41.

TABLE 41

| fw | R30 | Expression (4) |
|---|---|---|
| 3.647 | 9.153 | 0.71 |

More specifically, the above-mentioned conditional expression (4) is satisfied, and a zoom lens is realized, in which a coma aberration is corrected satisfactorily in rays outside an off-axis principal ray.

In the zoom lens of the present example, a focal length f4 of the fourth lens group 44 and a focal length fw of the entire system at the wide-angle end have the values shown: in Table 42.

TABLE 42

| fw | f4 | Expression (5) |
|---|---|---|
| 3.647 | 19.912 | 5.46 |

More specifically, the above-mentioned conditional expression (5) is satisfied, and a miniature zoom lens is realized, which ensures a back-focus enabling a crystal filter, an IR cut filter, and the like to be inserted.

In the zoom lens in the present example, the surface (on the object side) of a lens in the fourth lens group 44 is aspherical, and a local radius of curvature R40 in the vicinity of an optical axis and a local radius of curvature R41 in an outer peripheral portion have the values shown in Table 43.

TABLE 43

| R40 | R41 | Expression (6) |
|---|---|---|
| 9.800 | 10.413 | 1.06 |

More specifically, the above-mentioned conditional expression (6) is satisfied, and a zoom lens is realized, in which a coma aberration is corrected satisfactorily in rays inside an off-axis principal ray.

FIGS. 18 to 20 show various aberrations at the wide-angle end, the standard position, and the telephoto end of the zoom lens shown in Table 36.

As is understood from FIGS. 18 to 20, the zoom lens of the present example exhibits satisfactory aberration performance.

As described above, according to the zoom lens of the present invention, the third lens group is composed of three lenses: two positive lenses and one negative lens. Because of this structure, a miniature zoom lens is realized, in which a spherical aberration is corrected satisfactorily from a wide-angle end to a standard position. Furthermore, at least one aspherical surface is disposed in each of the second lens group, third lens group, and fourth lens group that have a small lens diameter, and optimum aspherical shape and lens type are adopted. Therefore, with a structure including a small number of lenses, a miniature zoom lens having a zoom ratio of about 14 times or more can be realized, in which an aberration is corrected satisfactorily.

Furthermore, according to the video camera of the present invention, because of the use of the zoom lens of the present invention, a miniature video camera of high image quality can be realized with a high zoom ratio.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A zoom lens, comprising:

a first lens group having positive refracting power and fixed with respect to an image plane;

a second lens group having negative refracting power and varying power, wherein the power is varied by moving along an optical axis;

a third lens group having positive refracting power and fixed with respect to the image plane; and a fourth lens group having positive refracting power and moving along an optical axis so as to keep the image plane varied by movement of the second lens group and an object at a predetermined position from a reference surface;

wherein the first, second, third, and fourth lens groups are disposed from the object side to the image plane side in this order, the second lens group comprises at least one aspherical surface, the third lens group comprises three lenses including a first positive lens, a second positive lens and a negative lens disposed from the object side in this order and comprises at least one aspherical surface, the fourth lens group comprises a positive lens with said positive lens including at least one aspherical surface, and the zoom lens has a zoom ratio of at least about 14 times.

2. The zoom lens according to claim 1, wherein a focal length f3 of the third lens group and a focal length fw of an entire system at a wide-angle end satisfy the following conditional expression (2):

$$2.5 < f3/fw < 4.0 \qquad (2).$$

3. The zoom lens according to claim 1, wherein a surface on the object side of a lens disposed closest to the object side in the third lens group is aspherical, and a local radius of curvature R20 in the vicinity of the optical axis of the object side surface of said lens disposed closest to the object side in the third lens group and a local radius of curvature R21 in an outer peripheral portion of the object side surface of said lens disposed closest to the object side in the third group satisfy the following conditional expression (3):

$$1.05 < R21/R20 < 3.5 \quad (3).$$

4. The zoom lens according to claim 1, wherein the negative lens of the third lens group comprises a concave surface, wherein an absolute value R30 of a smaller radius of curvature of said concave surface and a focal length f3 of the third lens group satisfy the following conditional expression (4):

$$0.35 < R30/f3 < 0.8 \quad (4).$$

5. The zoom lens according to claim 1, wherein a focal length f4 of the fourth lens group and a focal length fw of an entire system at a wide-angle end satisfy the following conditional expression (5):

$$2.5 < f4/fw < 6.0 \quad (5).$$

6. The zoom lens according to claim 1, wherein a surface on the object side of the positive lens in the fourth lens group is aspherical, and a local radius of curvature R40 in the vicinity of the optical axis of the object side surface of said positive lens and a local radius of curvature R41 in an outer peripheral portion of the object side surface of said positive lens satisfy the following conditional expression (6):

$$1.05 < R41/R40 < 1.75 \quad (6).$$

7. A video camera provided with a zoom lens of claim 1.
8. A video camera provided with a zoom lens of claim 2.
9. A video camera provided with a zoom lens of claim 3.
10. A video camera provided with a zoom lens of claim 4.
11. A video camera provided with a zoom lens of claim 5.
12. A video camera provided with a zoom lens of claim 6.
13. A zoom lens, comprising:
   a first lens group having positive refracting power and fixed with respect to an image plane;
   a second lens group having negative refracting power and varying power, wherein the power is varied by moving along an optical axis;
   a third lens group having positive refracting power and fixed with respect to the image plane; and
   a fourth lens group having positive refracting power and moving along an optical axis so as to keep the image plane varied by movement of the second lens group and an object at a predetermined position from a reference surface;
   wherein the first, second, third, and fourth lens groups are disposed from the object side to the image plane side in this order, the second lens group comprises at least one aspherical surface, the third lens group comprises three lenses including a positive lens, a cemented lens of a positive lens and a negative lens disposed from the object side in this order and comprises at least one aspherical surface, the fourth lens group comprises a positive lens with said positive lens including at least one aspherical surface, and the zoom lens has a zoom ratio of at least about 14 times.
14. A video camera provided with a zoom lens of claim 13.
15. A zoom lens, comprising:
   a first lens group having positive refracting power and fixed with respect to an image plane;
   a second lens group having negative refracting power and varying power, wherein the power is varied by moving along an optical axis;
   a third lens group having positive refracting power and fixed with respect to the image plane; and
   a fourth lens group having positive refracting power and moving along an optical axis so as to keep the image plane varied by movement of the second lens group and an object at a predetermined position from a reference surface;
   wherein the first, second, third, and fourth lens groups are disposed from the object side to the image plane side in this order, the second lens group comprises at least one aspherical surface, the third lens group comprises three lenses including a first positive lens, a negative lens, and a second positive lens disposed from the object side in this order and comprises at least one aspherical surface, the fourth lens group comprises a positive lens with said positive lens including at least one aspherical surface, and the zoom lens has a zoom ratio of at least about 14 times.
16. A video camera provided with a zoom lens of claim 15.
17. A zoom lens, comprising:
   a first lens group having positive refracting power and fixed with respect to an image plane;
   a second lens group having negative refracting power and varying power, wherein the power is varied by moving along an optical axis;
   a third lens group having positive refracting power and fixed with respect to the image plane; and
   a fourth lens group having positive refracting power and moving along an optical axis so as to keep the image plane varied by movement of the second lens group and an object at a predetermined position from a reference surface;
   wherein the first, second, third, and fourth lens groups are disposed from the object side to the image plane side in this order, the second lens group comprises at least one aspherical surface, the third lens group comprises three lenses including a first positive lens, and a cemented lens of a negative lens and a second positive lens disposed from the object side in this order and comprises at least one aspherical surface, the fourth lens group comprises a positive lens with said positive lens including at least one aspherical surface, and the zoom lens has a zoom ratio of at least about 14 times.
18. A video camera provided with a zoom lens of claim 17.
19. A zoom lens comprising:
   a first lens group having positive refracting power and fixed with respect to an image plane;
   a second lens group having negative refracting power and varying power, wherein the power is varied by moving along an optical axis;
   a third lens group having positive refracting power and fixed with respect to the image plane; and
   a fourth lens group having positive refracting power and moving along an optical axis so as to keep the image plane varied by movement of the second lens group and an object at a predetermined distance from a reference surface;
   wherein the, first, second, third, and fourth lens groups are disposed from an object side to the image plane side in this order, the second lens group comprises three lenses: a first negative lens, a second negative lens, and a positive lens disposed from the object side in this order, a surface on the object side of the second negative lens is aspherical, and a local radius of curvature R10 in the vicinity of an optical axis of said object side surface of said second negative lens and a local radius of curvature R11 in an outer peripheral portion of said object side surface of said second negative lens satisfy a conditional expression (1):

$$0.5 < R11/R10 < 0.95 \qquad (1)$$

the third lens group comprises three lenses including a first positive lens, a second positive lens and a negative lens disposed from the object side in this order and comprises at least one aspherical surface, the fourth lens group comprises a positive lens wherein the positive lens includes at least one aspherical surface, and the zoom lens has a zoom ratio of at least about 14 times.

20. A video camera provided with a zoom lens of claim 19.

* * * * *

UNITED STATES PATENT AND TRADEMARK OFFICE
CERTIFICATE OF CORRECTION

PATENT NO.    : 6,542,312 B1   Page 1 of 1
DATED         : April 1, 2003
INVENTOR(S)   : Hiroaki Okayama et al.

It is certified that error appears in the above-identified patent and that said Letters Patent is hereby corrected as shown below:

<u>Title page,</u>
Item [75], Inventors, please change "Yamatotakada" to -- Nara -- and "Takatsuki" to -- Osaka --.

Signed and Sealed this

Ninth Day of September, 2003

JAMES E. ROGAN
*Director of the United States Patent and Trademark Office*